United States Patent
Nett et al.

(10) Patent No.: US 12,465,942 B2
(45) Date of Patent: Nov. 11, 2025

(54) PIEZO ACTUATOR DEVICE

(71) Applicant: Dürr Systems AG, Bietigheim-Bissingen (DE)

(72) Inventors: Moritz Nett, Mühlacker (DE); Martin Stiegler, Beilstein (DE); Frank Schnur, Bönnigheim (DE); Lothar Rademacher, Bietigheim-Bissingen (DE); Dmitri Noak, Stuttgart (DE); Herbert Martin, Weinstadt-Grossheppach (DE)

( * ) Notice: Subject to any disclaimer, the term of this patent is extended or adjusted under 35 U.S.C. 154(b) by 102 days.

(21) Appl. No.: 18/557,332

(22) PCT Filed: Apr. 20, 2022

(86) PCT No.: PCT/EP2022/060429
§ 371 (c)(1),
(2) Date: Oct. 26, 2023

(87) PCT Pub. No.: WO2022/228968
PCT Pub. Date: Nov. 3, 2022

(65) Prior Publication Data
US 2024/0207886 A1  Jun. 27, 2024

(30) Foreign Application Priority Data

Apr. 27, 2021 (DE) .................... 10 2021 110 780.6
Aug. 17, 2021 (DE) .................... 10 2021 121 334.7

(51) Int. Cl.
*H02N 2/04* (2006.01)
*B05C 5/02* (2006.01)
(Continued)

(52) U.S. Cl.
CPC .......... *B05C 5/0279* (2013.01); *B05C 5/0233* (2013.01); *F16K 31/007* (2013.01);
(Continued)

(58) Field of Classification Search
USPC ........................... 251/129.04, 129.06
See application file for complete search history.

(56) References Cited

U.S. PATENT DOCUMENTS 4,022,166 A * 5/1977 Bart .................. F02M 51/0607
239/584
4,845,688 A * 7/1989 Butler .................... H02N 2/043
367/174

(Continued)

FOREIGN PATENT DOCUMENTS

DE  10 2014 009 025 A1  12/2015
DE  10 2018 001 048 A1  8/2019
(Continued)

OTHER PUBLICATIONS

International Search Report and Written Opinion for PCT/EP2022/060429 mailed Sep. 13, 2022 (14 pages; with English machine translation).

(Continued)

*Primary Examiner* — Matthew W Jellett
(74) *Attorney, Agent, or Firm* — Taft Stettinius & Hollister LLP; Thomas E. Bejin; John W. Carpenter

(57) ABSTRACT

The disclosure relates to a piezo actuator device, preferably for controlling a dispensing of an application agent onto a component, including: at least one movable valve body for opening and closing at least one valve seat, at least one preferably pivotable actuating arm for actuating the at least one valve body, and a piezo actuator configured to move the at least one valve body to close and/or open the at least one valve seat.

55 Claims, 21 Drawing Sheets

(51) Int. Cl.
*F16K 31/00* (2006.01)
*F16K 99/00* (2006.01)

(52) U.S. Cl.
CPC ........... *F16K 31/008* (2013.01); *H02N 2/046* (2013.01); *F16K 2099/0074* (2013.01); *F16K 2099/008* (2013.01)

(56) References Cited

U.S. PATENT DOCUMENTS

| | | | | |
|---|---|---|---|---|
| 5,271,226 | A * | 12/1993 | Stone | B64G 1/402 60/233 |
| 5,628,411 | A * | 5/1997 | Mills | F16K 31/005 251/368 |
| 5,720,417 | A * | 2/1998 | Wurth | B05C 5/0225 222/509 |
| 5,810,325 | A * | 9/1998 | Carr | H02M 3/07 251/30.05 |
| 6,157,115 | A * | 12/2000 | Hassler, Jr. | H02N 2/043 310/328 |
| 6,531,712 | B1 * | 3/2003 | Boecking | F02M 59/366 251/129.2 |
| 6,616,018 | B2 * | 9/2003 | Jonasson | B05B 1/3026 222/504 |
| 7,225,790 | B2 * | 6/2007 | Bartunek | F02M 65/005 123/294 |
| 8,381,765 | B2 * | 2/2013 | Reuter | F16K 31/006 251/300 |
| 8,439,328 | B2 * | 5/2013 | Takeshita | H01M 8/04089 251/368 |
| 9,114,430 | B2 * | 8/2015 | Ito | F16K 31/007 |
| 9,346,075 | B2 * | 5/2016 | Aguilar | B05C 5/0291 |
| 10,016,778 | B2 * | 7/2018 | Ikushima | B05B 17/0653 |
| 10,215,300 | B2 * | 2/2019 | Reith | B64G 1/402 |
| 10,400,906 | B2 * | 9/2019 | Shirey | F16K 31/086 |
| 10,593,859 | B2 * | 3/2020 | Reuter | H10N 30/802 |
| 10,646,893 | B2 * | 5/2020 | Burzo | H05K 13/0469 |
| 10,738,905 | B2 * | 8/2020 | Ito | B07B 11/04 |
| 10,913,088 | B2 * | 2/2021 | Fukada | B05C 5/0291 |
| 11,141,755 | B2 * | 10/2021 | Bittner | B05C 5/0225 |
| 11,536,259 | B2 * | 12/2022 | Ikushima | F04B 9/00 |
| 11,808,373 | B2 * | 11/2023 | Ito | H02N 2/043 |
| 11,982,368 | B2 * | 5/2024 | Ito | F16K 31/003 |
| 12,004,430 | B2 * | 6/2024 | Ito | H02N 2/04 |
| 12,169,030 | B2 * | 12/2024 | Ito | F16K 27/003 |
| 2003/0131791 | A1 * | 7/2003 | Schultz | B05C 5/0275 427/422 |
| 2005/0236438 | A1 | 10/2005 | Chastine et al. | |
| 2009/0107398 | A1 * | 4/2009 | Hassler, Jr. | B05C 11/1034 427/427.3 |
| 2012/0229000 | A1 * | 9/2012 | Asada | H02N 2/02 310/331 |
| 2014/0054331 | A1 | 2/2014 | Muller et al. | |
| 2015/0302292 | A1 | 10/2015 | Hong et al. | |
| 2015/0369373 | A1 | 12/2015 | Reith et al. | |
| 2016/0193624 | A1 * | 7/2016 | Ikushima | B05C 11/1034 239/102.2 |
| 2021/0078032 | A1 | 3/2021 | Mittag | |
| 2023/0043346 | A1 * | 2/2023 | Chee | F16K 31/007 |

FOREIGN PATENT DOCUMENTS

| | | |
|---|---|---|
| EP | 1588777 A2 | 10/2005 |
| WO | 2012100844 A1 | 8/2012 |
| WO | 2019154570 A1 | 8/2019 |

OTHER PUBLICATIONS

European Patent Office Examination Report for application No. 22 724 026.4-1009 dated May 23, 2025 (5 pages; English translation unavailable).

* cited by examiner

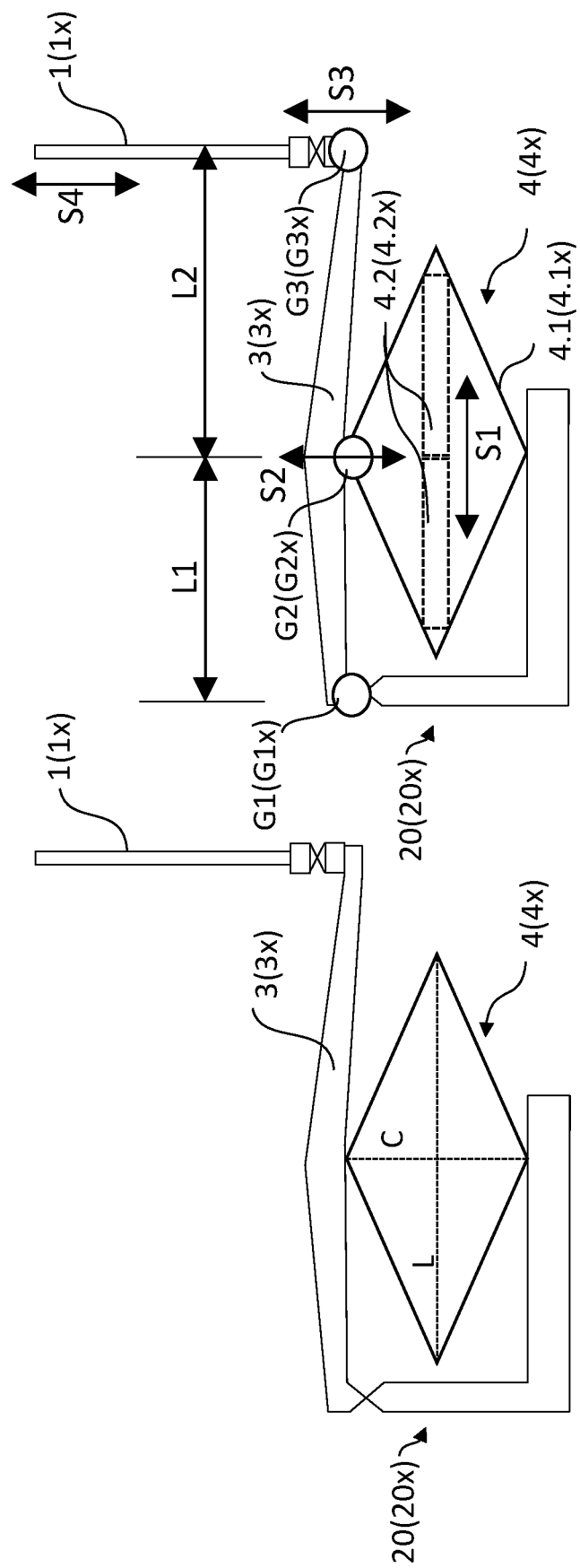

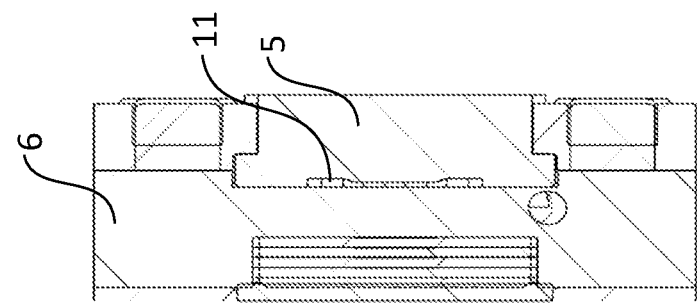
FIG. 17 Section SB-SB
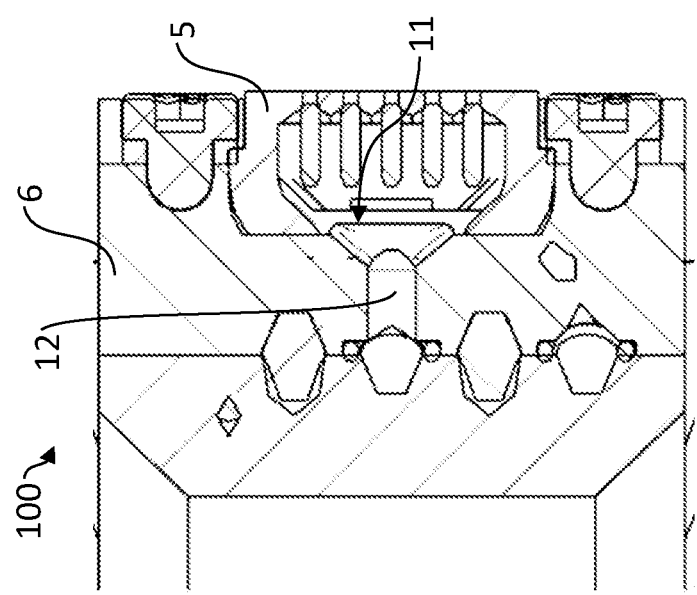
FIG. 16 Section SA-SA

PIEZO ACTUATOR DEVICE

CROSS-REFERENCE TO RELATED APPLICATIONS

This application is a national stage of, and claims priority to, Patent Cooperation Treaty Application No. PCT/EP2022/060429, filed on Apr. 20, 2022, which application claims priority to German Application No. DE 10 2021 110 780.6, filed on Apr. 27, 2021, and German Application No. DE 10 2021 121 334.7, filed on Aug. 17, 2021, [which applications are hereby incorporated herein by reference in their entireties.

FIELD

The disclosure relates to a piezo actuator device, preferably for controlling a dispensing of application agent onto a component (e.g., a motor vehicle body component), e.g., for dispensing a sealant. The piezo actuator device preferably serves to dispense an application agent onto the component, e.g., to seal an overlap (e.g., sheet metal overlap) and/or to protect an edge (in particular, sheet metal edge). The piezo actuator device can alternatively or additionally also be configured to planarly apply the application agent onto a component face in order to protect the component face. It is also possible, e.g., to dispense application agent in the form of an adhesive in order to bond components together.

BACKGROUND

WO 2019/154570 A1 discloses a metering valve having a closing body and a valve seat, the closing body being movable back and forth between a closed position, in which it is seated on the valve seat and closes a material outlet, and an open position, in which it is lifted off the valve seat and releases the material outlet, with an actuating element fixedly connected to the closing body and with two piezo actuators between which the actuating element is arranged, the actuating element being arranged in the closed position at a distance from a first of the piezo actuators which is smaller than the maximum change in length of the first piezo actuator, or rests loosely against the first piezo actuator and is arranged at a distance from the second of the piezo actuators which is greater than the maximum change in length of the first piezo actuator and wherein the actuating element, in the open position, is arranged at a distance from the second piezo actuator which is smaller than the maximum change in length of the second piezo actuator, or rests loosely on the second piezo actuator and is arranged at a distance from the first piezo actuator which is greater than the maximum change in length of the second piezo actuator. By means of a piezo actuator, the closing body experiences an initial acceleration when actuated. Thereupon, an electromagnet takes over the movement of the closing body over the entire stroke. The electromagnet also holds the closing body in the desired end position. A spring-loaded mechanism keeps the closing body closed even in a currentless state. The metering valve is relatively complex, e.g. because three functional units are required for opening and closing, which also have to be very precisely matched to each other. A high susceptibility to faults can therefore not be ruled out. In addition, it is not possible, e.g., to freely choose a stroke of the closing body as a further application variable, because this is always fixed to a specific value due to constructional reasons.

BRIEF DESCRIPTION OF THE DRAWINGS

FIGS. 10 to 12 illustrate in particular a functional/actuation principle according to an embodiment of the disclosure, FIG. 16 shows a sectional view along line SA-SA from FIG. 15, FIG. 17 shows a sectional view along line SB-SB from FIG. 15, FIGS. 18 and 19 show different views of a part of a piezo actuator device according to an embodiment of the disclosure.

DETAILED DESCRIPTION

Figure 1:
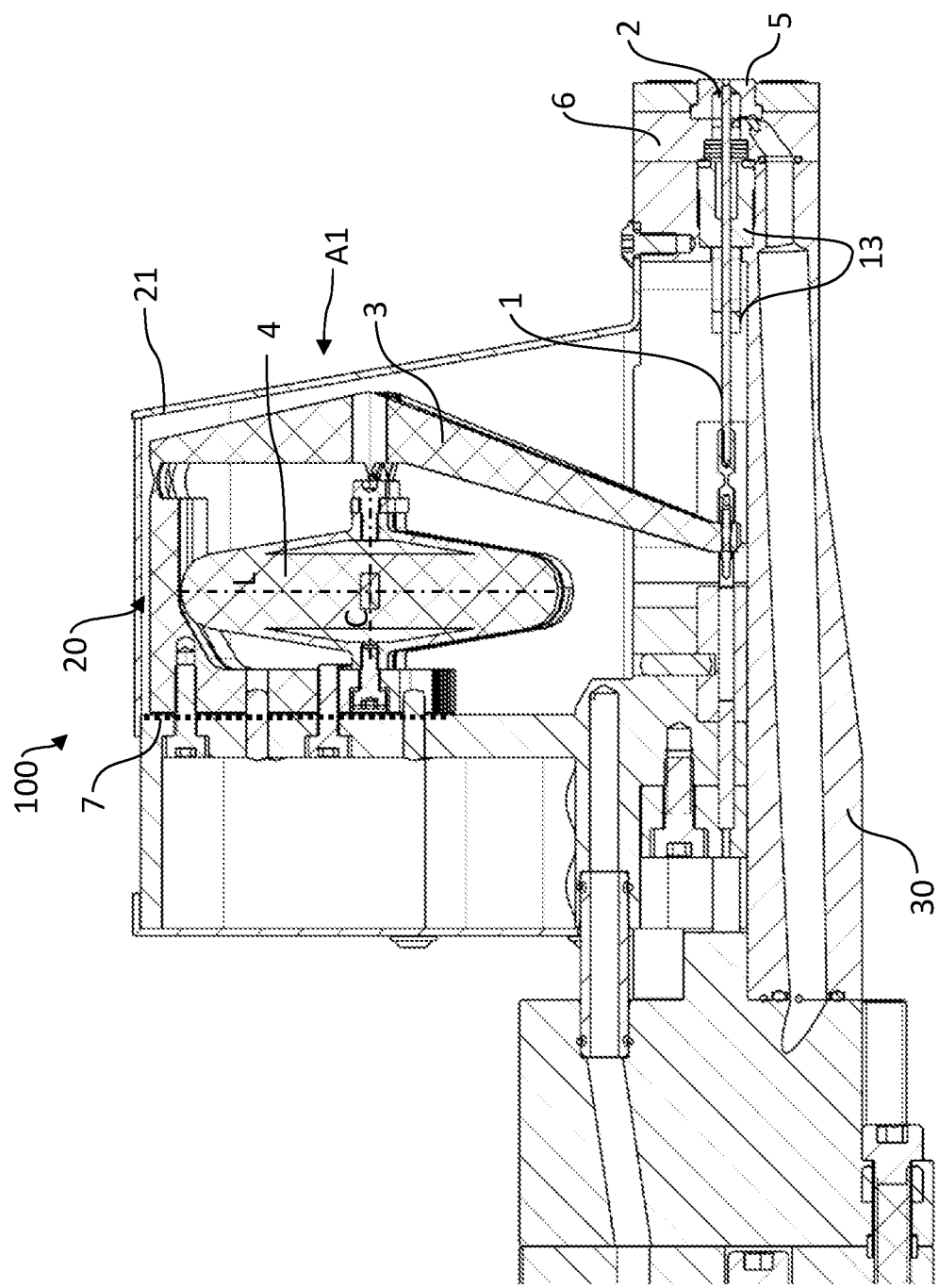
FIG. 1 shows a sectional view of a piezo actuator device according to an embodiment of the disclosure.
Figure 2:
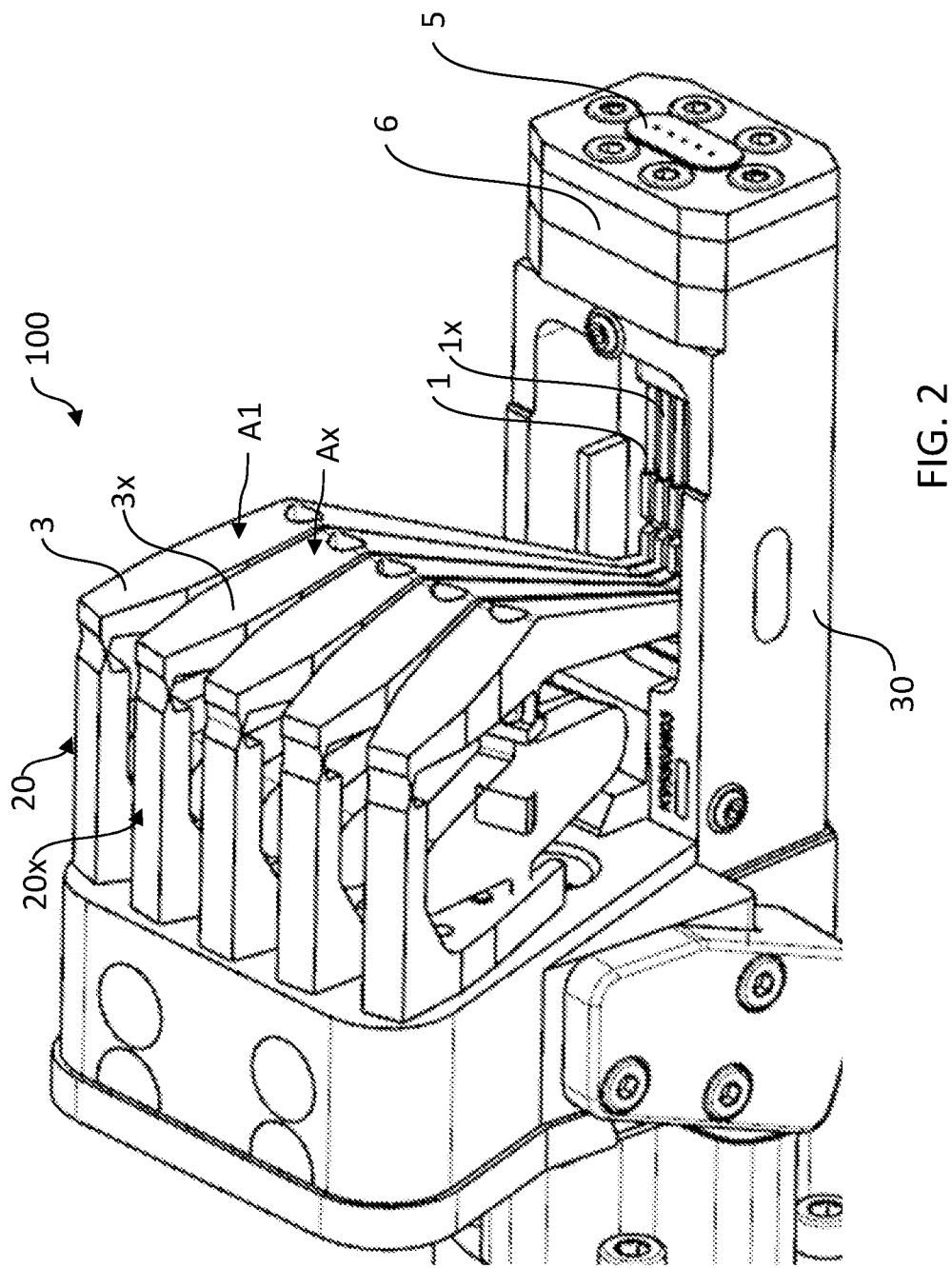
FIG. 2 shows a perspective view of the piezo actuator device, in particular with the housing disassembled.

The disclosure relates to a piezo actuator device, preferably for controlling a dispensing of an application agent onto a component, e.g. a motor vehicle body component.

The application agent can be, e.g., a viscous application agent, in particular a highly viscous application agent.

The application agent can comprise, e.g., a sealant, a polyvinyl chloride (PVC, in particular a PVC plastisol), a thickener, a paint, an adhesive, a preservative agent (e.g. wax) and/or an insulating material.

Preferably, the piezo actuator device can be used for dispensing an application agent onto the component.

The piezo actuator device can preferably be used for dispensing an application agent onto the component, e.g., to seal an overlap (e.g., sheet metal overlap) and/or to protect an edge (in particular, sheet metal edge). The piezo actuator device can alternatively or additionally be configured, e.g., to apply the application agent planarly onto a component face in order to protect the component face. It is also possible, e.g., to dispense application agent in the form of an adhesive in order to bond components together.

The piezo actuator device can optionally comprise, e.g., at least one functional unit and/or optionally at least two, at least three, at least four or at least five or at least six functional units.

It is possible that the piezo actuator device comprises the following, or preferably the functional unit comprises, e.g., the following, and/or preferably the at least two functional units respectively comprise, in particular, the following:

- at least one (preferably axially back and forth movable) valve body (e.g. valve needle) for opening and closing at least one valve seat,
- at least one actuating arm, preferably pivotable and/or configured as an actuating lever, for actuating the at least one valve body, and
- a piezo actuator, e.g. a single piezo actuator, configured to move (preferably by means of the at least one actuating arm) the at least one valve body for (preferably fully) closing and/or for (preferably fully) opening the at least one valve seat.

In the context of the disclosure, it is possible, e.g., that the piezo actuator device comprises, e. g., at least two or at least three valve bodies that are (e.g., indirectly via one or more actuating arms) commonly moved by a piezo actuator, in particular a single piezo actuator.

In the context of the disclosure, in particular, it is possible to use preferably only one piezo actuator per at least one valve body. One piezo actuator can thus, e.g., actuate a single valve body or multiple valve bodies.

The piezo actuator can here advantageously assume the function of a preferably full opening and optionally the function of a full closing of at least one valve seat.

It is particularly advantageous, e.g., that by means of the piezo actuator at least one valve body, in particular its stroke, can be adjusted to any intermediate positions between a fully opened valve seat position and a fully closed valve seat position, which can be realized, e.g., by applying an expedient voltage to the piezo actuator.

Depending on the use case, it is thus possible, e.g., to implement a pulsating application with the piezo actuator device, to interrupt the application and/or to realize an operation in which, depending on the stroke, a specific amount of an application agent is continuously applied. Such a variation can also be advantageously implemented, e.g., within a single application path, especially since only the control of the piezo actuator preferably needs to be adapted therefor.

The piezo actuator can be configured, e.g., to move the at least one valve body into a fully closed valve seat position and/or to move the at least one valve body into a fully opened valve seat position.

The piezo actuator can preferably be configured to (in particular indirectly) move, in particular to actuate, the at least one valve body to (preferably fully) open and/or to (preferably fully) close the at least one valve seat.

In the context of the disclosure, advantageously, at least one valve seat or even at least two or at least three valve seats can thus be preferably fully opened and/or preferably fully closed with a piezo actuator (preferably only one piezo actuator).

The piezo actuator preferably serves for actuating the at least one actuating arm and can expediently be coupled therefor to the at least one actuating arm.

The piezo actuator can be configured, e.g., to move, by means of the at least one actuating arm, the at least one valve body to close and/or open the at least one valve seat.

The at least one actuating arm can thus in particular form a link between the piezo actuator and the at least one valve body.

It is possible that the piezo actuator comprises an in particular mechanical preload, in particular is installed with a preload, in order to actuate the at least one actuating arm by means of the preload to close the at least one valve seat. This can, e.g., enable the at least one valve seat to be closed, in particular automatically, when the piezo actuator and/or the piezo actuator device is, e.g., switched voltageless and/or currentless.

The state "normally closed" can thus be achieved by an in particular mechanical preload of the piezo actuator. Thus, preferably no additional mechanics such as e.g. a valve, a spring, a magnet and/or an (additional) piezo actuator is required therefor. However, the state "normally open" can also be realized in this way, for example.

To open the at least one valve seat, the piezo actuator can, e.g., be supplied with, in particular, electrical excitation energy (e.g., electrical voltage and/or electrical current).

It is possible that the at least one actuating arm is part of a three-joint lever mechanism.

It is possible that the at least one actuating arm is pivotable about a (expedient first) joint, and/or piezo actuator is coupled to the at least one actuating arm via a (expedient second) joint, and/or the at least one actuating arm is coupled to the at least one valve body via a (expedient third) joint.

The expedient first joint, the expedient second joint and/or the expedient third joint can be configured, e.g., by a material weakening, e.g., a portion of reduced bending stiffness, in particular relative to two adjacent portions of higher bending stiffness. The material weakening and/or the reduced bending stiffness can preferably be produced by a local reduction in cross-section.

The expedient first joint can preferably form a bearing point that allows, e.g., rotation of the actuating arm, but can preferably prevent all displacements. The first joint can thus form, e.g., a fixed bearing.

The expedient first joint, the expedient second joint and/or the expedient third joint can, e.g., be one-piece integrally connected to the at least one actuating arm and/or be configured as a solid-body joint.

It is possible that the actuating arm is preferably a one-piece integral part of a frame.

The piezo actuator can be arranged within the frame, e.g., and preferably fastened to the frame.

The frame can, e.g., be configured to be demountable and/or open on at least one side. The frame can be configured, e.g., in a substantially U-shaped or L-shaped configuration, e.g., with legs of equal or different lengths and/or obliquely oriented legs.

The piezo actuator and/or a frame structure discussed below can be oriented, e.g., substantially in and/or substantially parallel to the plane of the frame.

It is possible that the piezo actuator is preferably fixedly mounted in its transverse direction on one side (e.g., to the frame) and/or coupled on the other side (expediently indirectly or directly) to the at least one actuating arm. Alternatively or additionally, the piezo actuator can, e.g., in its longitudinal direction, be, in particular bearing-free, deformable.

It is possible that the piezo actuator comprises an in particular elastically deformable, metallic and/or shell-shaped frame structure.

The piezo actuator and/or the frame structure can preferably be configured elongated and comprise, e.g., a longitudinal axis and a transverse axis, which can, e.g., be aligned substantially perpendicularly to each other.

The frame structure preferably serves to reinforce (in particular increase) an actuating force onto the at least one actuating arm and/or can be configured, e.g., as a bending stress frame.

It is possible that at least one piezo active element (e.g., at least one piezo stack) is accommodated in the frame structure.

The at least one piezo active element can act on the frame structure, in particular from the inside.

The at least one piezo active element preferably serves for longitudinally oriented deformation of the frame structure, e.g., to effect a particularly transversely oriented deformation of the frame structure for generating an actuating force for the at least one actuating arm.

The at least one piezo active element can thus preferably act on the frame structure substantially in the longitudinal direction of the frame structure, e.g. to generate an (in particular transversely oriented) actuating force on the at least one actuating arm.

It is possible that the frame structure is circumferential in its circumferential direction, in particular is closed.

The frame structure is preferably configured elongated, e.g. substantially elliptical to substantially rhomb-shaped and/or to substantially ring-shaped or circular-shaped.

It is possible that in the frame structure multiple piezo active elements (e.g. piezo stacks) are coupled in the longitudinal direction of the frame structure to each other and/or to the frame structure, e.g. for force and/or displacement increase.

In the transverse direction of the frame structure, e.g., a free space can be provided to allow the frame structure to change shape.

The piezo actuator can, preferably transversely (e.g., substantially perpendicularly) to its longitudinal extent, actuate the at least one actuating arm. Alternatively or additionally, the frame structure can, preferably transversely (e.g., substantially perpendicularly) to its longitudinal extent, actuate the at least one actuating arm.

The direction of actuation onto the at least one actuating arm can be, e.g., substantially parallel or transverse (e.g., substantially perpendicular) to the direction of displacement of the at least one valve body.

The at least one piezo active element can be configured, e.g., of ceramic, in particular low-voltage ceramic.

The piezo actuator device can be configured to generate and/or dispense application agent droplets and/or to generate and/or dispense application agent jets.

The piezo actuator is preferably controllable with (expediently electrical) excitation energy, in particular voltage, expediently voltage signals.

It is possible that the piezo actuator is configured and preferably controllable in order to adjust (e.g. by way of changing its in particular electrical excitation energy) a stroke of the at least one valve body preferably arbitrarily and/or freely, e.g. to at least one in particular arbitrary intermediate position between a (expediently fully) closed valve seat position and an expediently fully opened valve seat position, whereby, e.g., a throttling function and/or generation of application agent jets can be enabled and, alternatively or additionally, an application agent droplet size can be, e.g., specifically changed, in particular adjusted (e.g., in such a way that an outflow rate can be changed in a valve body-specific manner).

The stroke of the at least one valve body means, in particular, a maximum distance that the at least one valve body can travel in its longitudinal direction.

The piezo actuator can thus preferably be configured to bring the at least one valve body only to, e.g., at least one freely definable intermediate position between a (expediently fully) closed valve seat position and an expediently fully opened valve seat position.

In the context of the disclosure, it is thus preferably possible to be able to (preferably freely) adjust, in particular to be able to freely choose, a stroke of the at least one valve body as an application variable.

Preferably, the stroke can be adjusted and/or moved to, e.g., any intermediate position.

It is possible that the stroke is adjustable, in particular freely selectable, e.g. in dependence of the in particular electrical excitation energy of the piezo actuator.

Due to the adjustable stroke, preferably the position of the at least one valve body can be precisely controlled expediently at any time.

It is possible that a (e.g. electronic) control means is provided.

Preferably, by means of the control means, the e.g. electrical excitation energy for the piezo actuator and/or the piezo actuators can be controlled.

The closing of the at least one valve seat can expediently be performed by the at least one valve body, by pressing the at least one valve body into the at least one valve seat. This can be done, expediently when the application agent is dispensed, with a high actuation frequency (e.g., up to 700 Hz) so that the at least one valve body impacts into the at least one valve seat each time with a certain speed and thus force.

It can be disadvantageous in particular that the permanent impact causes a high wear (e.g., at the tip of the at least one valve body and/or in the at least one valve seat), or alternatively or additionally, e.g., a high-frequency sound at a high volume is generated.

Therefore, it is possible that the stroke of the at least one valve body can be adjusted, e.g., to one or more intermediate positions, and/or can be adjusted such that the at least one valve body encounters the at least one valve seat with a reduced velocity of, e.g., substantially 0 m/s.

It is possible, e.g., to suspend a high-frequency movement of the at least one valve body (e.g., during the path and/or during the dispensing of the application agent) and to replace it, for example, with a permanent, partial opening of the at least one valve seat in order to be able to produce, e.g., an application, in particular an application seam.

Alternatively or additionally, it is possible, e.g., that the piezo actuator is configured and preferably controllable in order to brake (e.g., by means of changing its in particular electrical excitation energy, expediently voltage) the at least one valve body, preferably in such a way that the at least one valve body encounters the at least one valve seat with reduced velocity. If braking of the at least one valve body expediently occurs accurately timed before its impact on the associated valve seat, a hard impact can advantageously be avoided.

In the context of the disclosure, it is possible, e.g., that the at least one valve body encounters on the at least one valve seat with a reduced velocity, e.g. with substantially 0 m/s, but preferably encounters on the at least one valve seat in a braked manner in any case.

The braking of the at least one valve body can preferably be adjustable in dependence of the in particular electrical excitation energy (in particular voltage, expediently voltage signals) for the piezo actuator.

The control means can preferably be configured to control the in particular electrical excitation energy for the piezo actuator and/or the piezo actuators, e.g., in order to be able to control and thus to in particular adjust the stroke and/or the braking of the at least one valve body, and alternatively or additionally, e.g., in order to be able to control at least two piezo actuators in an advantageously phase-shifted manner.

The control means is in particular an electronic control means and can comprise, e.g., at least one computing unit and/or at least one processor.

The control means can comprise, e.g., a memory unit in which a control software (e.g., a control program) and/or a control logic can be stored, according to which the excitation energy for the piezo actuator and/or the piezo actuators can be controlled.

It is possible within the scope of the disclosure, e.g., that the control means with its function is distributed to a central control unit or multiple different hardware components and/or control units.

It is possible that the piezo actuator device comprises a generator means for generating the excitation energy, in particular voltage (expediently voltage signals), for the piezo actuator and/or multiple piezo actuators, and/or an amplification means for amplifying the excitation energy generated by the generator means and supplied to the piezo actuator and/or the piezo actuators.

The generator means can comprise, e.g., one or more generators, e.g. for one piezo actuator or multiple piezo actuators.

The amplification means can expediently comprise one or more amplifiers, e.g., for one piezo actuator or multiple piezo actuators.

In particular, the control means can be configured to control the generator means and/or the amplification means.

Therefore, in the context of the disclosure, the control means can preferably control the excitation energy for the piezo actuator and/or multiple piezo actuators via the generator means and/or the amplification means.

Expediently, the control means can also be used to control a plurality of piezo actuators.

It is possible that for braking and/or for realizing the at least one stroke intermediate position, e. g., an amplification is dispensed with, the amplification is reduced, or the amplification is increased.

As already mentioned, e.g., a high-frequency sound can be produced at a high volume when valve bodies encounter their valve seat.

It is possible that the control means is configured to control at least two piezo actuators in a phase-shifted manner (e.g., with excitation energy), preferably for counter-sound generation and/or for active noise reduction (expediently "Active Noise Reduction" ("ANR")-"anti-sound"), preferably in such a way that, e.g., at least two valve bodies advantageously encounter their valve seat phase-shifted and/or time-shifted.

In this way, it is advantageously possible to reduce or even substantially cancel out arising noisiness of at least one valve body, preferably by phase-shifted control of at least one piezo actuator of at least one other valve body.

The control means can control the at least two piezo actuators, e.g., phase-shifted by substantially 180° and/or by means of at least approximately destructive interference.

As already mentioned, it is possible that the piezo actuator is installed with a preload in order to actuate, by means of the preload, the at least one actuating arm to close the valve seat.

Alternatively or additionally, it is possible that the at least one valve body is operatively connected, e.g. directly or indirectly, to a preferably mechanical and/or additional preloading element (e.g. a spring, in particular a helical spring) for generating a preload in order to actuate, by means of the preload, the at least one valve body to close the at least one valve seat.

This can, e.g., enable that the at least one valve seat is closed, in particular automatically, when the piezo actuator and/or the piezo actuator device is, e.g., switched voltageless and/or currentless.

The state "normally closed" or "normally open" can thus also be achieved, e.g., by a "passive" solution that can advantageously be integrated constructively simply in the piezo actuator device in and does not require any additional control.

The two embodiments "piezo actuator comprising preload" and "preloading element" can be used, e.g., as alternatives or in combination, e.g., to achieve an increased closing force.

The at least one valve body can be expediently fastened to the at least one actuating arm, e.g., by means of a fastening element (e.g., screw, bolt, etc.), wherein the fastening element can serve, e.g., to receive and/or guide the preloading element.

The at least one valve body, the preloading element and/or the fastening element can be arranged substantially coaxially, for example.

The piezo actuator device can comprise, e.g., at least one compensating underlay (e.g., at least one shim sheet or shim piece) for position and/or preload adjustment of the at least one valve body. In the context of the disclosure, the at least one compensating underlay is preferably at least one tuning sheet.

It is possible, e.g., that the piezo actuator device comprises at least one compensating underlay for the common position and/or preload adjustment of at least two valve bodies, so that a position and/or preload adjustment of multiply valve bodies can be made possible by means of, e.g., one and the same compensating underlay.

This can advantageously enable, e.g., that multiple valve bodies, e.g. a complete package preferably of all valve bodies, can be adjusted commonly to a substantially identical preload and/or position.

It is possible that in particular the frame is mounted on at least one compensating underlay or multiple frames are mounted on at least one compensating underlay. Here, it is possible, e.g., that at least two frames are mounted, e.g., on a common compensating underlay and/or at least two frames are respectively mounted on an own compensating underlay.

By installing one or more suitable compensating underlays such as, in particular, shim sheets/pieces, manufacturing tolerances can advantageously be easily compensated, which is why, e.g., manufacturing with manufacturing tolerances that are not too tight is possible and/or, e.g., no tolerance selection of parts has to be carried out. Nevertheless, it is possible to adjust the valve bodies in particular sufficiently precisely with respect to their position and/or preload.

It is possible that the piezo actuator device comprises an in particular external nozzle plate with, e.g., at least two, at least three, at least four or at least five valve seats and/or an e.g. corresponding number of dispensing openings for dispensing the application agent.

However, it is also possible that at least two dispensing openings can be supplied with application agent by means of one valve body and/or valve seat.

The nozzle plate can thus also comprise, e.g., at least two, at least three, at least four or at least five dispensing openings for dispensing application agent.

The nozzle plate is preferably configured as a single piece (e.g., one-piece integral and/or continuous) and/or can comprise, e.g., a flush front. This can, e.g., assist clean break-off of application agent droplets, allow low adhesion of application agent, and/or allow easy cleaning of the nozzle plate.

The at least two valve seats can comprise, e.g., a common closing plane.

Nozzle plates with nozzle diameters of different sizes, e.g., can comprise the same closing plane, so that after a nozzle plate change the same preload as before can be set again.

This allows, e.g., a quick nozzle plate change (e.g. necessary due to nozzle plate wear), a quick sealing system change and/or a quick change of nozzle diameters.

This enables, e.g., a change of the application pattern after replacing the nozzle plate, preferably without having to readjust the preload of the valve bodies.

It is possible that the piezo actuator device comprises a head piece.

The nozzle plate can be arranged on the outside of the head piece.

The head piece can be arranged between the nozzle plate and the lance body described further below.

It is possible that at least two valve bodies are passed through the head piece.

It is possible that, in particular for (preferably dispensing side) removal of at least one valve body from the piezo actuator device, the head piece and/or the nozzle plate can be dismantled.

This can enable, e.g., that a valve body can, after detaching (e.g., from the actuating arm and/or with a tool, in particular a special tool), be pulled out of the piezo actuator device (e.g., to the front, in particular to the dispensing side).

This can enable, e.g., an easy maintenance and/or a quick replacement of worn valve bodies.

The piezo actuator device preferably comprises a sealing system, e.g., of a plurality of metal plates, which can form, e.g., a labyrinth seal (e.g., a half or full labyrinth seal). The metal plates can be, e. g., hard metal plates.

Thus, the sealing system can in particular comprise a labyrinth seal, e.g. a half or full labyrinth seal.

It is possible that at least two valve bodies are sealed by means of the sealing system.

The sealing system can be arranged at and/or (expediently at least in sections) in the head piece.

The individual piezo actuators (in particular of the respective functional units) can preferably be controlled independently of each other, in particular separately, which enables, e.g., a generation of defined application agent patterns and/or application agent paths with, e.g., different cross sections (e.g. in height and/or width), with, e.g., viscous, in particular highly viscous application agent.

The individual piezo actuators, and thus in particular the individual valve bodies, can preferably be actuated independently of each other with different actuation frequencies.

It is possible that at least two (or at least three, at least four or at least five) valve seats and/or at least two (or at least three, at least four or at least five) dispensing openings for dispensing application agent are configured in one and the same nozzle plate.

The piezo actuator device can comprise, e.g., at least two actuating arms, frames and/or piezo actuators arranged angularly to each other (in particular with respect to their longitudinal axes). The piezo actuator device can comprise, e.g., at least two actuating arms whose longitudinal axes approach each other, e.g., in the direction of at least two valve bodies. Alternatively or additionally, cross-sections of at least two actuating arms can taper in the direction of at least two valve bodies. This can, e.g., enable a high packing density and/or to arrange the valve bodies in a small grid dimension.

The piezo actuator device can, e.g., comprise at least two piezo actuators that are arranged offset preferably relative to the longitudinal direction of at least two valve bodies and/or actuate at least two valve bodies of different lengths. This can also enable, e.g., a high packing density and/or to arrange the valve bodies in a small grid dimension.

Piezo actuators of the piezo actuator device can thus be arranged, e.g., side by side on the one hand and/or offset to one another relative to the longitudinal direction of the valve bodies on the other hand.

The piezo actuator device can comprise, e.g., a preferably slot-shaped connection in order to be able to supply the application agent to at least two valve bodies, wherein the connection can comprise, e.g., different passage cross sections for, in particular, substantially uniform distribution of the application agent to the at least two valve bodies.

The different passage cross sections are configured in particular for substantially uniform distribution of the application agent to the at least two valve bodies.

This can enable, e.g., a substantially uniform distribution of application agent to the at least two valve bodies and/or a substantially uniform pressure level at, in particular directly upstream of, the valve seats.

The connection thus serves in particular for substantially uniform distribution of application agent to spaces preferably directly upstream of the valve seats.

The connection is preferably configured in such a way that it comprises a larger passage cross-section for e.g. outer valve bodies, up to which the application agent travels a relatively long distance, than e.g. for a valve body, in particular a middle valve body, up to which the application agent travels a relatively short distance.

By configuring the connection with different passage cross sections for application agent distribution, it can thus be advantageously achieved that outer valve bodies are also supplied with application agent substantially as good as at least one inner valve body.

It is possible that the connection is configured, e.g., in sections in the nozzle plate and/or, e.g., in sections in the head piece.

The piezo actuator device can, e.g., comprise a (in particular single, e.g. one-piece integral) guide component, by means of which at least two valve bodies are axially guided at at least two guide positions that are, in particular, axially spaced apart from one another, and preferably the at least two valve bodies run bearing-free between the at least two guide positions.

It is possible that the piezo actuator device comprises a lance body, in particular an elongated lance body, on the front side of which, preferably exteriorly, the nozzle plate and/or the head piece can be arranged.

It is possible that at least two valve bodies extend in the lance body, preferably substantially in the longitudinal direction of the lance body.

The piezo actuator device can comprise a housing, e.g. hood-shaped and/or demountable, which can be arranged, e.g., laterally outside at the lance body.

It is possible that at least two frames, at least two piezo actuators and/or at least two actuating arms are arranged in the housing.

At least two actuating arms preferably extend from the housing into the lance body in order to be able to actuate, in particular drive, at least two valve bodies in the lance body.

The lance body can, e.g., be rotatable about its longitudinal axis and/or be connected to a rotary feedthrough via which the application agent can be supplied and/or returned.

The piezo actuator device can comprise, e.g., an application agent supply (e.g., forerun) and an application agent return (e.g., runback) for application agent circulation or comprise at least two application agent supplies via which, e.g., different application agents can be supplied. The piezo actuator device can thus also be configured in particular for selectively dispensing different application agents.

The application agent supply and the application agent return or the at least two application agent supplies can, e.g., open into an intermediate region between the head piece and the nozzle plate.

It is possible that the piezo actuator device is connected to a heating means by means of which the application agent can be heated, which can be advantageous, e.g., in the case of highly viscous application agent, in particular adhesive.

The housing can comprise at least one cooling opening, e.g., via which heat can be dissipated from the housing.

The piezo actuator device can comprise a cooling device (e.g., a blower) to apply, in particular to flush and/or to flow through, the housing with a cooling fluid (e.g., cooling air). The cooling device can comprise, e.g., a blower, etc. The cooling can be performed, e.g., by means of flushing the housing with air and/or by means of flowing air through the housing.

The cooling device can be arranged, e.g., inside the housing or outside the housing.

The piezo actuator device can, e.g., comprise at least two valve bodies that can be moved commonly by a, in particular a single, piezo actuator (e.g., via one or more actuating arms), e.g., to move (in particular indirectly) the at least two valve bodies to (preferably fully) open and/or to (preferably fully) close at least two valve seats, e.g., up to a fully closed valve seat position and/or up to a fully opened valve seat position.

In the context of the disclosure, advantageously, at least one valve seat or even at least two valve seats can thus be preferably fully opened and/or preferably fully closed with, in particular, only a single piezo actuator.

For example, it is possible that e.g. a piezo actuator and/or an actuating arm is used to actuate e.g. at least two valve bodies.

If, e.g., no "high resolution" is required by means of the piezo actuator device and/or, e.g., not all piezo actuators (in particular not all valve bodies) need to be actuated independently (e.g., separately), the piezo actuator device can also be configured in such a way that at least two valve bodies are moved commonly, in particular via at least one actuating arm, by a single piezo actuator, whereby preferably a summarization of valve bodies to a functional group can be realized.

In particular, this can enable a reduction of the complexity and of the costs.

Furthermore, this makes it advantageously much easier to realize, e.g., embodiments with multiple, e.g. at least four or at least five, valve bodies.

The piezo actuator device can be configured, e.g., to generate application agent droplets and/or application agent jets.

However, the piezo actuator device can also be configured, e.g., for the selective generation of application agent droplets and application agent jets.

The piezo actuator device can be configured, e.g., to apply to the at least one valve body, preferably by means of the associated piezo actuator, an, e.g. controllable and/or variable, actuation frequency, e.g. an actuation frequency of, e.g., 0 Hz to, e.g., at least 300 Hz, at least 400 Hz, at least 550 Hz, at least 650 Hz or above 700 Hz or even above 750 Hz. A size and/or a temporal spacing of individual application agent droplets can preferably be varied by changing the actuation frequency.

Different piezo actuators can be applied with, e.g., the same or a different actuation frequency.

Preferably, all piezo actuators should be constructively identical (e.g., for improved interchangeability). However, they can preferably be controlled differently.

This enables, e.g., that the application agent, in particular application agent droplets, can be shot to the component.

The piezo actuator device thus enables, e.g., large application distances, which facilitates application to application areas that are difficult to access and/or far away.

The piezo actuator device also preferably enables defined application of the application agent, which reduces or even completely eliminates the need for reworking. The defined application of the application agent can also advantageously reduce the consumption of application agent, which can, e. g., promote sustainable production.

The piezo actuator device can comprise, e.g., at least one functional unit, at least one valve body, at least one valve seat, at least one actuating arm, at least one piezo actuator and/or at least one frame.

The piezo actuator device can comprise, e.g., at least two, at least three, at least four, or at least five functional units, valve bodies, valve seats, actuating arms, piezo actuators and/or frames.

The piezo actuator device can comprise, e.g., more valve bodies and/or more valve seats than piezo actuators, or can comprise the same number of valve bodies and/or the same number of valve seats as piezo actuators.

For example, the piezo actuator device can comprise more dispensing openings than valve bodies and/or valve seats.

In the context of the disclosure, it is possible that a piezo actuator, in particular a single piezo actuator, is provided per at least one valve body in order to expediently move the at least one valve body (preferably by means of at least one actuating arm) for (in particular fully) opening and/or (in particular fully) closing at least one valve seat, e.g., up to a fully closed valve seat position and/or up to a completely opened valve seat position.

The piezo actuator can be used expediently to realize the state "normally closed" or the state "normally open".

The piezo actuator device can be configured, e.g., for generation of planar applications.

The piezo actuator device can be configured, e.g., for generation of defined application agent patterns and/or application agent paths with, e.g., different cross sections (e.g., in height and/or width).

The application agent is preferably viscous, in particular highly viscous.

The at least two valve bodies preferably extend substantially parallel to each other.

In the context of the disclosure, the piezo actuator preferably serves for, in particular indirectly, moving and/or actuation at least one valve body.

It should be mentioned that the phrase "transverse" and/or "transverse direction" etc. as used herein preferably means substantially perpendicular to the longitudinal direction.

It should be mentioned that the actuation direction of the piezo actuator onto the at least one actuating arm can, e.g., substantially correspond to the transverse direction of the piezo actuator.

It should also be mentioned that the frame structure can be configured, e.g., in a substantially elliptical and/or rhomb shaped.

The actuating arm can comprise, e.g., a transmission ratio of preferably between 4:1 and 2:1, e. g., a transmission ratio of about 3:1.

The tip of the valve bodies can preferably be configured substantially spherical.

The valve seats, in particular the nozzle inlets, can be configured e.g. substantially conical.

The valve bodies are preferably made from metal, in particular hard metal.

The at least two valve bodies preferably extend substantially parallel to each other, e.g. in the lance body.

By means of the piezo actuator device, in particular compact dimensions are possible, which advantageously allows a high packing density of multiple valve bodies.

The control means can, e.g., control the piezo actuator and/or the piezo actuators, in particular indirectly or directly.

The (expediently electrical) excitation energy for the piezo actuator and/or the piezo actuators can be (expediently electrical) voltage, in particular (expediently electrical) voltage signals.

The excitation energy for the piezo actuator and/or the piezo actuators can in particular be the excitation energy supplied (expediently directly or indirectly) to the piezo actuator and/or the piezo actuators.

The excitation energy for the piezo actuator and/or the piezo actuators can be, e.g., excitation energy amplified or non-amplified or reduced by means of the amplification means.

The disclosure preferably comprises a piezo actuator device, in particular for controlling a dispensing of an application agent onto a component, including:
- at least one (preferably axially back and forth) movable valve body (e.g., a valve needle) for opening and closing at least one valve seat,
- at least one actuating arm (preferably pivotable, in particular configured as an actuating lever) for actuating the at least one valve body, and
- a piezo actuator, e.g. a single piezo actuator, which is preferably configured to move (in particular by means of the at least one actuating arm) the at least one valve body to (preferably fully) close and/or to (preferably fully) open the at least one valve seat (e.g. up to a fully closed valve seat position and/or up to a fully opened valve seat position).

The disclosure comprises, e.g., a piezo actuator device, in particular for controlling a dispensing of an application agent onto a component, comprising in particular a functional unit which can comprise the following, or in particular at least two functional units which can respectively include the following:
- at least one (preferably axially back and forth) movable valve body (e.g. a valve needle) for opening and closing at least one valve seat,
- at least one actuating arm (preferably pivotable, in particular configured as an actuating lever) for actuating the at least one valve body, and
- a piezo actuator, e.g. a single piezo actuator, which is preferably configured to move (preferably by means of the at least one actuating arm) the at least one valve body to (preferably fully) close and/or to (preferably fully) open the at least one valve seat (e.g. up to a fully closed valve seat position and/or up to a fully opened valve seat position.

The disclosure also includes, e.g., an application device comprising at least one piezo actuator device as disclosed herein.

In particular, the application device is configured to produce a seam seal on the component.

The application device can comprise, e.g., a single-axis or multi-axis (e.g., at least 2, at least 3, at least 4 or at least 5 axis) manipulator, in particular robot for guiding the piezo actuator device.

However, it is also possible that the piezo actuator device is mounted in a stationary manner and is thus, e.g., not mounted on a robot or manipulator.

The control means can also serve, e.g., to control the manipulator, in particular robot, disclosed herein. The control means can thus be, e.g., the manipulator control means, in particular the robot control means.

It is possible that a (e.g. camera or laser based) detection system (e.g. with one or more cameras and/or one or more lasers) is provided, e.g. in order to carry out in particular a component measurement timely preceding the application and/or in order to detect an application result, e.g. for carrying out a quality check, in particular an online quality check. A control means can be provided to control the application in dependence of parameters detected by means of the detection system.

The disclosure also includes a method for a piezo actuator device, preferably for controlling a dispensing of an application agent onto a component, in particular for a piezo actuator device and/or an application device as disclosed herein, so that the disclosure for the piezo actuator device and/or for the application device expediently also applies to the method.

In the method, at least one movable valve body can open and close at least one valve seat, at least one (preferably pivotable) actuating arm can actuate the at least one valve body, and a piezo actuator can move the at least one valve body to close and/or open the at least one valve seat.

The preferred embodiments of the disclosure described with reference to the figures partially correspond to each other, wherein similar or identical parts are indicated by the same reference signs, and reference can also be made to the description of the other embodiments for explanation thereof in order to avoid repetitions. For illustrative purposes, not all parts in all figures are provided with reference signs.

In the context of the disclosure, a piezo actuator device 100 can comprise, e.g., at least one, at least two, at least three, at least four or at least five functional units. For the sake of clarity, only two functional units are provided with reference signs in the figures, wherein the "x" can represent, by way of example, at least one further component that is in particular similar or substantially the same.

FIGS. 1 to 9 show different views of a piezo actuator device 100 according to an embodiment of the disclosure. The piezo actuator device 100 preferably serves to control a dispensing of an application agent onto a component (e.g., a motor vehicle body component), e.g., to dispense a sealing agent, e.g., to seal a seam (e.g., a weld seam or flanged seam, etc.). The application agent is typically a viscous application agent, in particular a highly viscous application agent.

In the embodiment of FIGS. 1 to 9, the piezo actuator device 100 preferably comprises five functional units, wherein for the sake of clarity, as already mentioned, only two functional units are provided with reference signs, namely the functional unit A1 and the functional unit Ax, wherein the functional unit Ax represents at least one further functional unit, as also already mentioned. In the following, however, mostly only the functional unit A1 is described, wherein the description can expediently also apply to the at least one further functional unit Ax. However, the disclosure also comprises a piezo actuator device 100 with expediently, e.g., only one functional unit A1.

The functional unit A1 or, in general, the piezo actuator device 100 comprises, in particular, a valve body 1, movable axially back and forth and configured as a valve needle, for opening and closing a valve seat 2 and an actuating arm 3, e.g., pivotable, preferably configured as an actuating lever, for actuating the valve body 1. A piezo actuator 4, in particular only a single piezo actuator 4, is provided for the at least one valve body 1 and configured to actuate and/or to move the valve body 1 preferably by means of the actuating arm 3, in particular in such a way that the valve seat 2 can preferably be fully closed and/or fully opened.

The functional unit Ax or, in general, the piezo actuator device 100 also comprises, in particular, a valve body 1x, movable axially back and forth and configured as a valve needle, for opening and closing a valve seat 2x and an actuating arm 3x, e. g., pivotable, preferably configured as an actuating lever, for actuating the valve body 1x. A piezo actuator 4x, in particular only a single piezo actuator 4x, is provided for the at least one valve body 1x and configured to actuate and/or to move the valve body 1x preferably by means of the actuating arm 3x, in particular in such a way that the valve seat 2x can preferably be fully closed and/or fully opened.

However, it is also possible, e.g., that a functional unit A1, Ax or, in general, the piezo actuator device 100 preferably comprises at least two movable valve bodies for opening and closing of at least two valve seats, at least one actuating arm (preferably pivotable, e.g. configured as an actuating lever) for actuating the at least two valve bodies and a, preferably a single, piezo actuator for moving the at least two valve bodies (preferably via the at least one actuating arm).

The piezo actuator 4 is preferably configured elongated with a longitudinal direction L and a transverse direction C (e.g. FIG. 1) and can be installed with an in particular mechanical preload and thus in particular comprise a preload to actuate, by means of the preload, the actuating arm 3 and thus the valve body 1 for expediently automatically closing the valve seat 2, in particular when the piezo actuator device 100 is switched current- and/or voltageless.

The closed state of the valve body 1 ("normally closed") can thus be achieved by preload of the piezo actuator 4. This can enable that the valve seat 2 is closed automatically without an additional functional assembly (e.g. valve, spring and/or magnet, etc.) and/or without, e.g., an electrical power supply, when the actuator device 100 is switched current- and/or voltageless.

In particular, the piezo actuator 4 also serves to, in particular fully, open the valve seat 1, wherein the piezo actuator 4 therefor can be supplied with electrical excitation energy, in particular electrical voltage.

In the context of the disclosure, a single piezo actuator 4 can thus be provided for preferably fully opening and preferably fully closing at least one valve seat 1.

The actuating arm 3 is preferably part of a frame 20 and of a three-joint lever mechanism, which will be explained in more detail below.

The valve seats 2; 2x and a corresponding number of dispensing openings for dispensing of application agent are configured in one and the same nozzle plate 5. The nozzle plate 5 is preferably configured in one piece (e.g., one-piece integral and/or continuous) and comprises, e.g., a substantially flush front. This can, e.g., assists clean break-off of application agent droplets, allow for low adhesion of application agent, and/or allow for easy cleaning of the nozzle plate 5.

The nozzle plate 5 is arranged on an outlet side of a head piece 6, in particular mounted thereon, wherein the valve bodies 1; 1x pass through the head piece 6.

Figure 5:
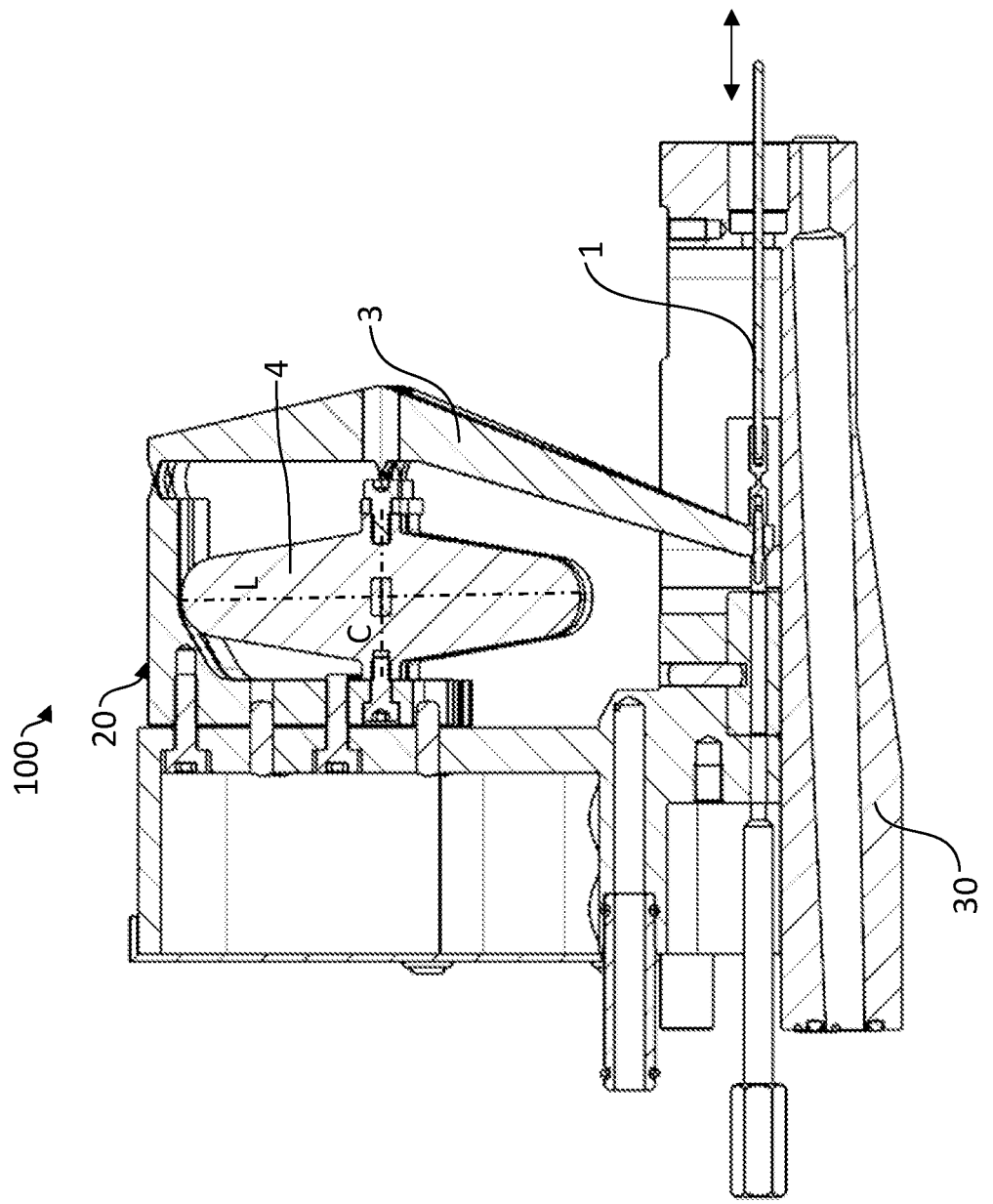
FIG. 5 shows a sectional view of the piezo actuator device, in particular with disassembled housing, disassembled head piece and disassembled nozzle plate.

As can be seen, e.g., from FIG. 5, the head piece 6 and/or the nozzle plate 5 can be dismantled from a lance body 30 so that, e.g., worn valve bodies 1; 1x can be removed, in particular pulled out, from the piezo actuator device 100 towards the front, in particular towards the dispensing side of the application agent. Therefor, the valve body 1 to be removed can be detached, e.g. with a special tool, and then pulled out to the front. This enables simple maintenance and, in particular, rapid replacement of worn valve bodies 1; 1x.

The principle of valve body assembly and valve body disassembly is schematically indicated by the double arrow in FIG. 5.

Figure 6:
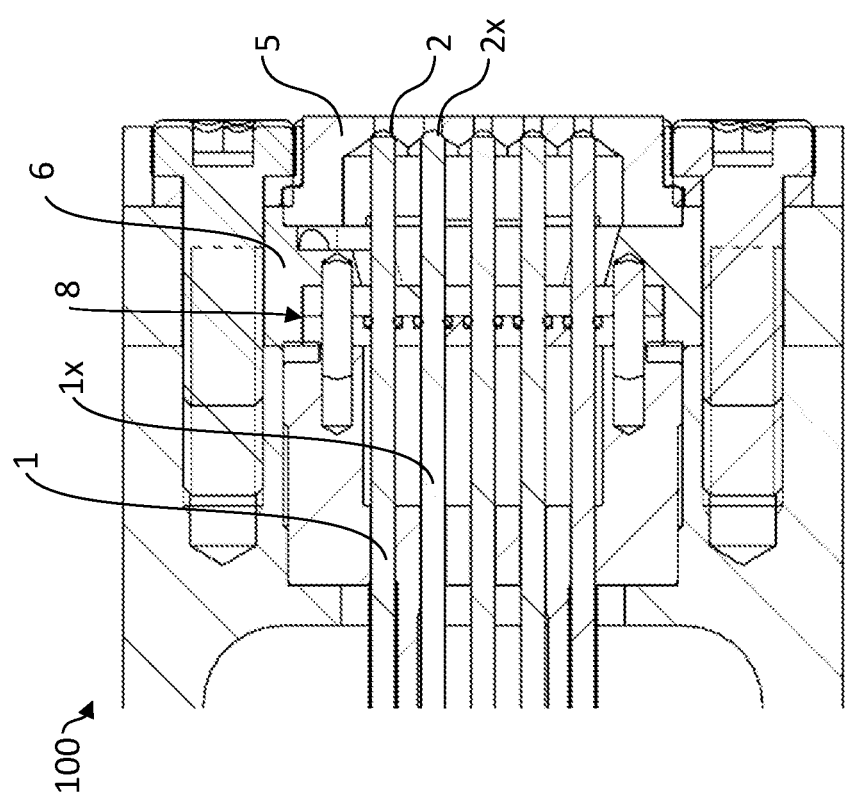
FIGS. 6 and 7 show different sectional views of the piezo actuator device.
Figure 7:
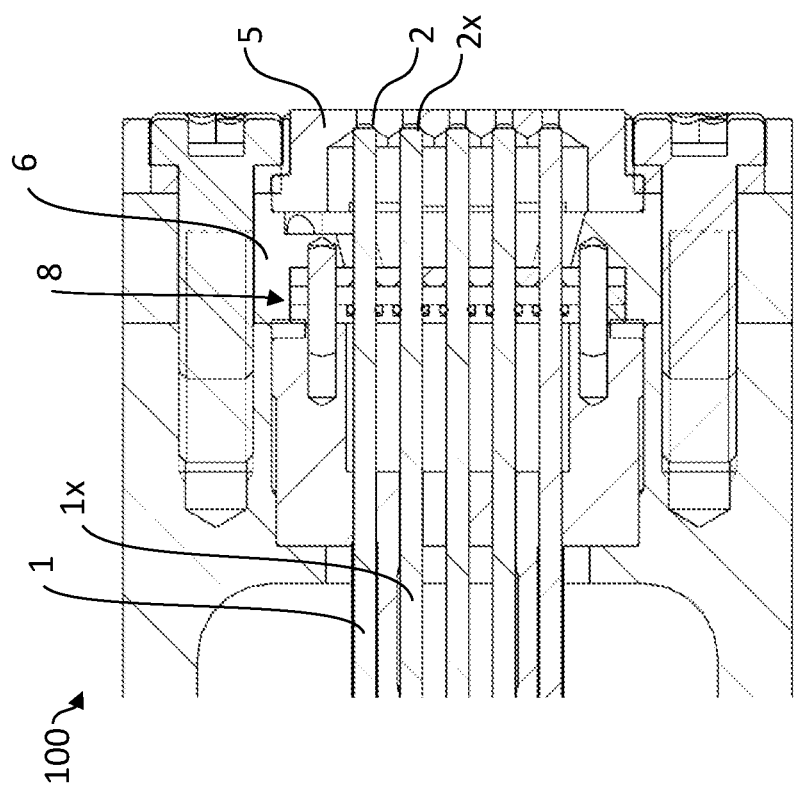

The piezo actuator device 100 also comprises a sealing system 8, e.g. shown in enlarged view in FIGS. 6 and 7, by means of which the valve bodies 1; 1x can be sealed. The sealing system 8 comprises, e.g., multiple metal plates, in particular hard metal plates, and is preferably configured as a metal-sealing labyrinth seal, in particular a full or half labyrinth seal. The sealing system 8 is preferably arranged at least in sections in the head piece 6 and/or placed at the head piece 6.

The sealing system 8 advantageously comprises only low friction, which in turn advantageously means low actuating forces for the valve bodies 1; 1x. Advantageously, the sealing system 8 also requires only a small installation space and further advantageously comprises a long service life.

Figure 3:
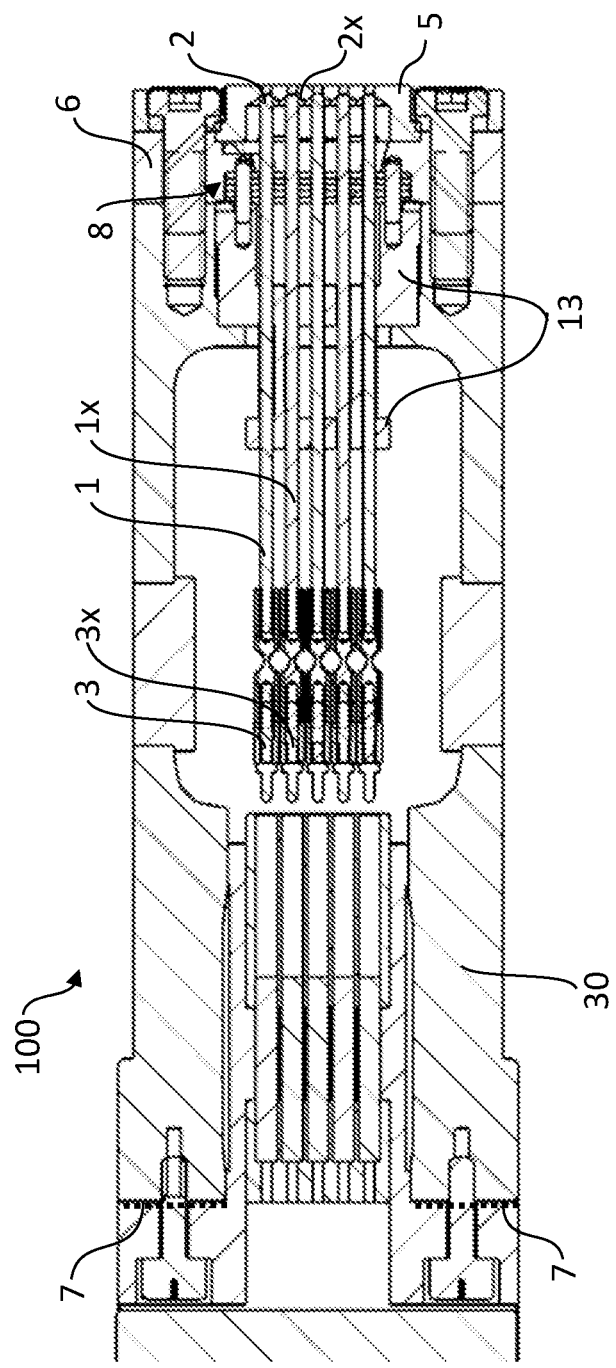
FIG. 3 shows a sectional view of the piezo actuator device.
Figure 4:
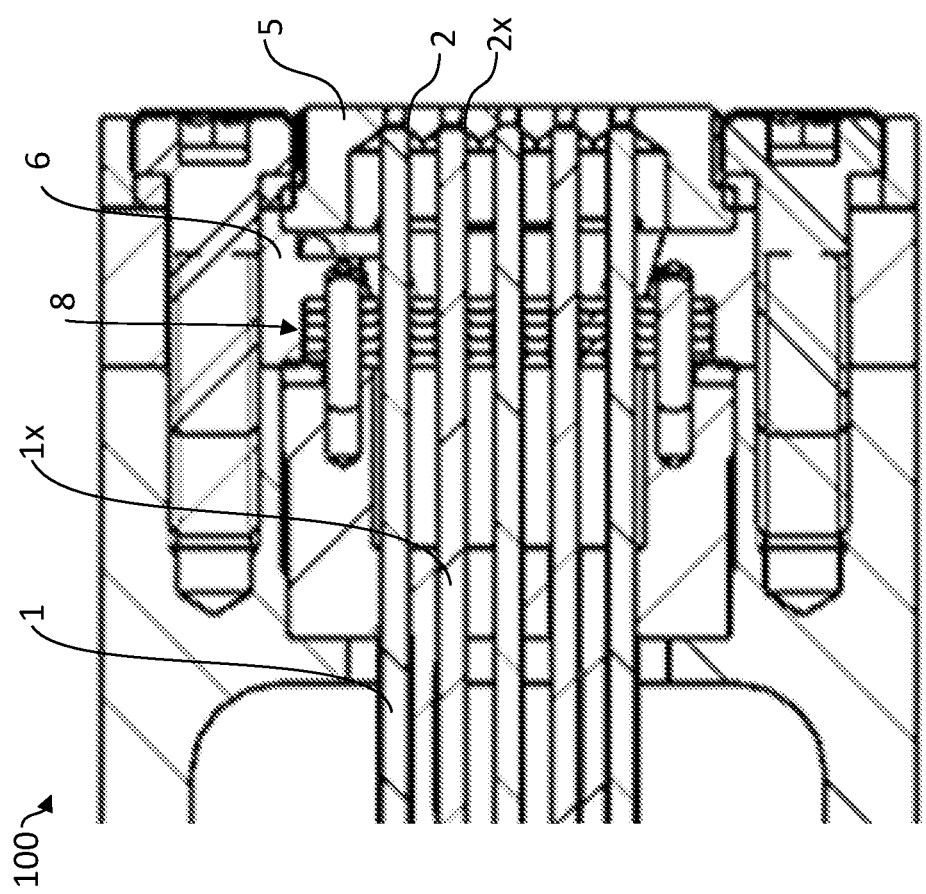
FIG. 4 shows a detailed view of FIG. 3.

The piezo actuator device 100 can also comprise one or more compensating underlays 7 (e.g., one or more shim sheets or shim pieces), seen e.g. in FIGS. 1 and 3, for position and/or preload adjustment of one or more valve bodies 1; 1x.

For example, one and the same compensating underlay 7 can be used for common position and/or preload adjustment of expediently all valve bodies 1; 1x, whereby the valve bodies 1; 1x can be adjusted to substantially the same position and/or preload.

The use of at least one compensating underlay 7 enables an advantageously highly accurate position and/or preload adjustment of one or more valve bodies 1; 1x. Potential, possibly relatively large manufacturing tolerances can thus be compensated. Advantageously, it is thus not necessary to perform a tolerance selection of parts.

By means of the at least one compensating underlay 7, the valve bodies 1; 1x can be positioned substantially identically and/or provided with substantially the same preload, in particular easily and quickly.

The at least one compensating underlay 7 preferably serves as an underlay for one or more of the frames 20, 20x described further below. Here, it is possible, e.g., that one frame 20 is mounted on at least one compensating underlay 7 and/or multiple frames 20; 20x are mounted on at least one compensating underlay 7.

Multiple frames 20; 20x can also, e.g., be mounted on a common compensating underlay 7 and/or multiple frames 20; 20x can be mounted on a respectively own compensating underlay 7.

It has already been described that the piezo actuator 4 can be installed with a mechanical preload and thus can comprise in particular a preload in order to actuate, by means of the preload, the actuating arm 3 and thus the valve body 1 for expediently automatically closing of the valve seat 2, in particular when the piezo actuator device 100 is switched current- and/or voltageless.

Figure 8:
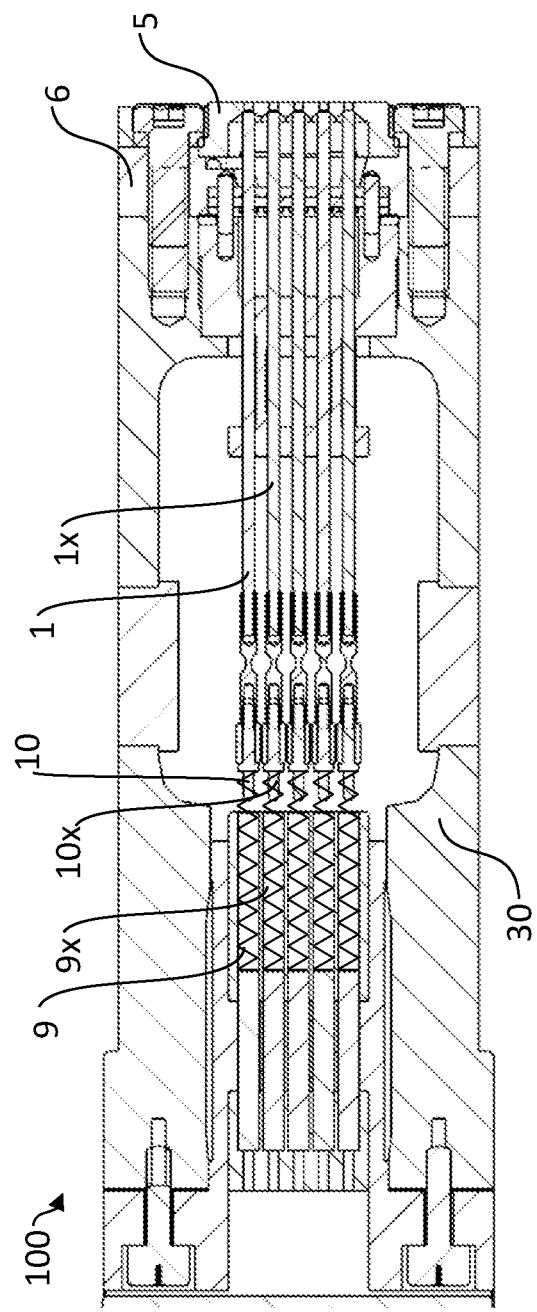
FIG. 8 shows a sectional view of the piezo actuator device.

If the piezo actuator 4 is not mechanically preloaded to close the valve seat 2, a preloading element 9 can be used therefor, as shown e.g. in FIG. 8.

Thus, instead of or in addition to an own preload, the valve body 1 can be, expediently directly or indirectly, operatively connected to a preloading element 9 (e.g. a spring, in particular a helical spring) for generating a preload, in order to actuate, by means of the preload, the valve body 1 to close the valve seat 2, in particular when the piezo actuator device 100 is switched current- and/or voltageless.

This represents an advantageously simple "passive" solution, which can be constructively easily integrated into the piezo actuator device 100, and does not require any additional control.

The valve body 1 can be fastened to the actuating arm 3 by means of a fastening element 10 (e.g. screw, bolt, etc.), wherein the fastening element 10 can advantageously also serve to receive and/or guide the preloading element 9.

The valve body 1, the preloading element 9 and/or the fastening element 10 are preferably arranged substantially coaxially.

Figure 14:
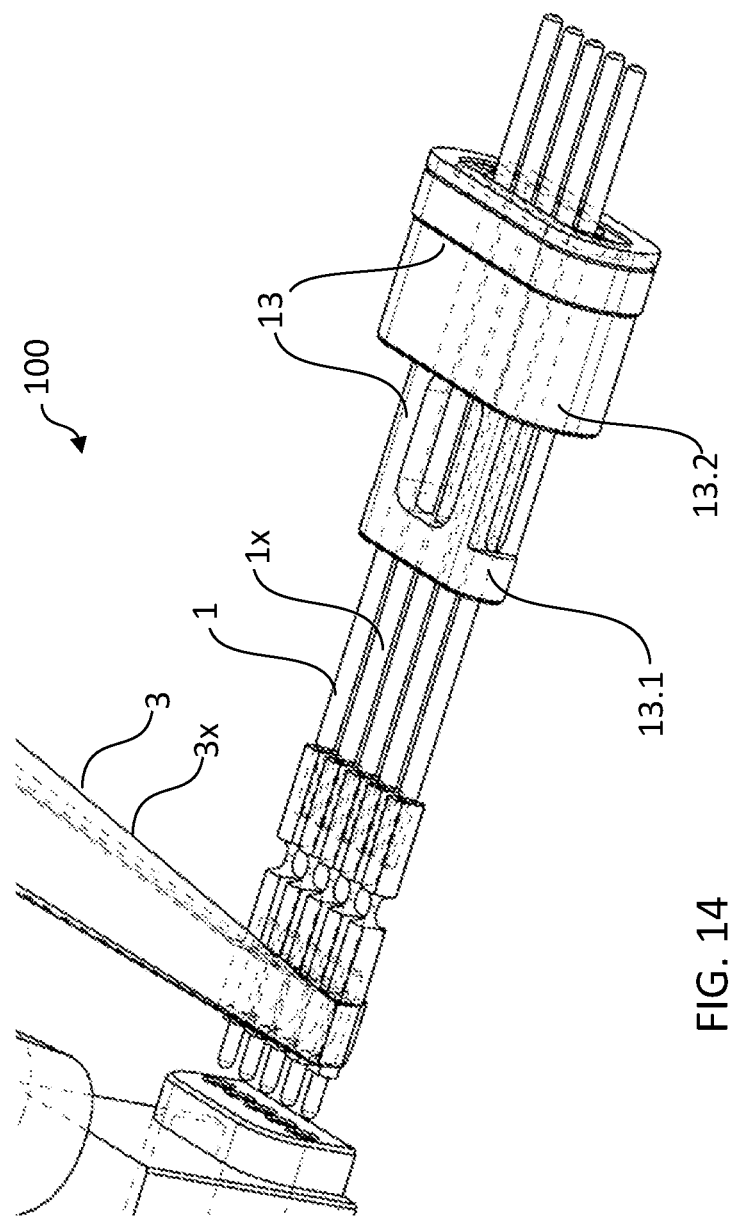
FIG. 14 illustrates a perspective view of a part of the piezo actuator device.

A guide component 13, which can be seen, e.g., in FIGS. 1, 3 and 14, in particular configured as a single component, serves to guide the valve bodies 1; 1x at at least two guide positions 13.1 and 13.2 that are axially spaced apart from one another, wherein the valve bodies 1; 1x can run between the at least two guide positions 13.1, 13.2 preferably bearing-free. Thus, one and the same guide component 13 can be used for guiding multiple valve bodies 1; 1x. This can advantageously enable precise guiding by means of few interfaces between the parts and/or manufacturing in an alignment. Alternatively or additionally, the friction between guide component 13 and valve bodies 1; 1x can be reduced to a minimum necessary for valve body guidance.

Figure 9:
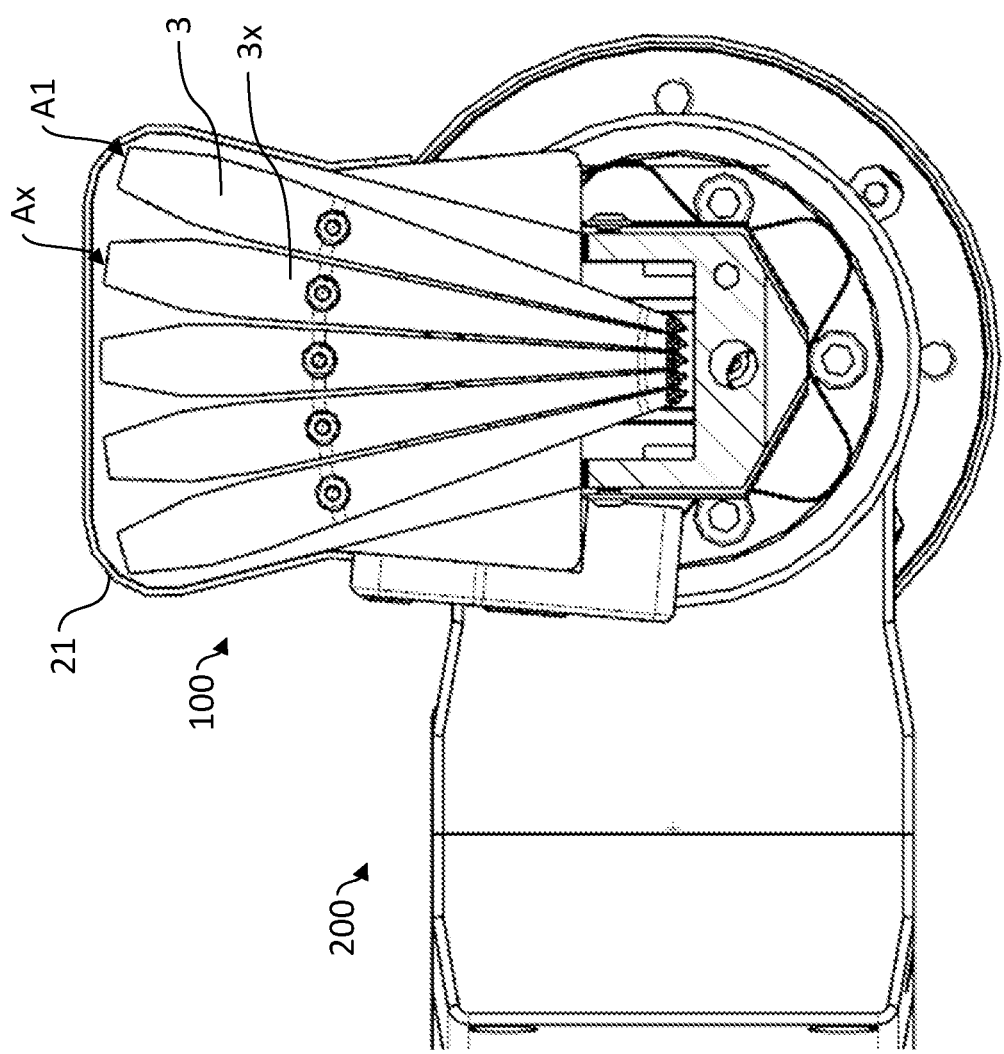
FIG. 9 shows a top view of a part of the piezo actuator device.

FIG. 9 shows that the actuating arms 3; 3x can be arranged angularly to each other, wherein their piezo actuators 4; 4x can preferably also be arranged angularly.

In particular, longitudinal axes of the actuating arms 3; 3x can approach each other in the direction of the valve bodies 1; 1x. Cross sections of the actuating arms 3; 3x can, e.g., also taper in the direction of the valve bodies 1; 1x. This can, e.g., create substantially a fan and/or trapezoidal shape.

The piezo actuator device 100 also comprises an expediently relatively long or relatively short lance body 30, at the head end of which the nozzle plate 5 and/or the head piece 6 is arranged, in particular externally, and in which the valve bodies 1; 1x extend. A housing 21 is arranged laterally outside at the lance body 30.

The valve bodies 1; 1x and the guide component 10 are preferably arranged in the lance body 30.

Preferably, the head piece 6 and the nozzle plate 5 are arranged front-sided at the lance body 30.

Preferably, the piezo actuators 4; 4x are arranged in the housing 21.

The housing 21 can comprise one or more ventilation openings and be connected to a cooling means (e.g., a blower) in order to apply a cooling fluid to the housing 21, in particular to flush it with a cooling fluid.

The actuating arms 3; 3x preferably extend out of the housing 21 into the lance body 30 in order to be able to drive the valve bodies 1; 1x.

It can also be seen from FIGS. 1 to 9 that the functional units A1; Ax are preferably configured in a modular manner, in particular starting from the nozzle plate 5 and/or the head piece 6.

A change of nozzle plates is possible, advantageously without having to readjust a preload of the valve bodies 1; 1x.

The nozzle plates 5 used preferably have the same closing plane, whereby after a change to a nozzle plate 5 with, e.g., other nozzle diameters, the same preload can be restored as before.

This enables advantageously faster changing of nozzle diameters and/or fast replacement of worn nozzle plates 5 and/or sealing systems 8.

This enables, e.g. after replacing the nozzle plate 5, a change the application pattern, preferably without new Adjusting the preload of the valve bodies 1; 1x.

FIGS. 1 to 9 illustrate in particular an embodiment in which a piezo actuator 4; 4x, preferably a single piezo actuator 4; 4x, per valve body 1; 1x is used, so that in the embodiment there are, e.g., five piezo actuators 4 and five valve bodies 1; 1x, wherein, as already mentioned, embodiments with more than five or less than five piezo actuators 4 together with the same number of valve bodies 1; 1x are also possible.

FIGS. 10 to 13 serve in particular to explain a functional/actuating principle according to an embodiment of the disclosure.

The actuating arm 1 is in particular part of a three-joint lever mechanism, with expediently three joints, namely a first joint G1, a second joint G2 and a third joint G3.

The actuating arm 3 is pivotable about the first joint G1. The first joint G1 preferably forms a bearing point that allows rotation of the actuating arm 3, but prevents all displacements. The first joint G1 can thus form a fixed bearing.

The elongated configured piezo actuator 4 is coupled to the actuating arm 3 via the second joint G2.

The actuating arm 3 is coupled to the valve body 1 via the third joint G3.

By changing the length ratios L1 and L2 of the actuating arm 3, the force and/or the distance, in particular the stroke, of the valve body 1 can be changed. Also the actuation frequency expediently changes.

The actuating arm 3 is preferably one-piece integral part of a frame 20, which is preferably open at least on one side, wherein the piezo actuator 4 can be arranged in the frame 20.

The piezo actuator 4 can in its transverse direction C be mounted on one side to the frame 20 and on the other side fixed to the actuating arm 3 by means of the second joint G2.

In its longitudinal direction L, however, the piezo actuator 4 can be arranged, preferably bearing-free deformable, in the frame 20, wherein a suspension is possible centrally or front-sided in order to define the installation position.

In the embodiment, all joints G1, G2, G3 are configured by a material weakening, are one-piece integrally connected to the actuating arm 3 and/or are configured as a solid-body joint.

The piezo actuator 4 preferably comprises an elastically deformable frame structure 4.1. The frame structure 4.1 can be configured in particular as a bending stress frame and/or for reinforcing an actuating force on the actuating arm 3.

The frame structure 4.1 and/or the piezo actuator 4 can be configured at least slightly elongated and actuate, e.g. transversely to the longitudinal direction L, the actuating arm 3, in particular substantially perpendicular to the longitudinal direction L. The frame structure 4.1 is preferably configured circumferentially.

In the frame structure 4.1, e.g., one or more piezo active elements 4.2 (e.g., one or more piezo stacks) for longitudinally oriented deformation of the frame structure 4.1 are accommodated, wherein the longitudinally oriented deformation causes a transversely oriented deformation of the frame structure 4.1 for generating the actuating force on the actuating arm 3. In other words, a longitudinal deformation can cause a transverse deformation, wherein the transverse deformation serves to actuate the actuating arm 3.

It is possible that the frame structure 4.1 preloads at least one piezo active element 4.2.

In the frame structure 4.1, preferably multiple piezo active elements 4.2 are, in the longitudinal direction L of the frame structure 4.1, coupled to each other and to the frame structure 4.1, wherein, e. g., a free space can be provided in the transverse direction C of the frame structure 4.1.

The functional/actuating principle functions substantially as follows:

S0: Valve body 1 is in contact with valve seat 2 via a mechanical preload (e.g. generated by mechanical preload of piezo actuator 4 and/or by preloading element 9) to close valve seat 2 (in particular state: "normally closed").

S1: Piezo actuator 4, in particular piezo stack (e.g. piezo active elements 4.2) changes its length under voltage. In particular, deformation of the frame structure 4.1 in longitudinal direction L.

S2: Piezo actuator 4, in particular frame structure 4.1 moves the actuating arm 3. In particular, deformation of frame structure 4.1 in transverse direction C.

S3: Actuating arm 3 provides stroke of the valve body 1.

S4: Valve body 1 releases valve seat 2, in particular in dependence of the actuating/switching frequency of piezo actuator 4.

A particular advantage is that the piezo actuator 4 is configured to be able to adjust a stroke of the valve body 1 preferably freely choosable, whereby in particular a maximum distance that the valve body 1 can travel in its longitudinal direction can be expediently adjusted.

The stroke of the valve body 1 depends here in particular on the amount of the excitation energy (in particular excitation voltage), by means of which the piezo actuator 4, in particular the at least one piezo active element 4.1 (e.g. piezo stack), is applied with.

The piezo actuator 4 can thus be configured in particular to adjust a stroke of the valve body 1 to preferably any intermediate position between a closed valve seat position and a fully opened valve seat position, which can preferably enable a throttle function and/or generation of application agent jets. Alternatively or additionally, an adjustable stroke can be used to change in particular an application agent droplet size, so that the outflow rate can be changed in a valve body-specific manner.

The piezo actuator 4 thus preferably enables not only a fully opened valve seat position (and optionally a closed valve seat position), but also, e.g., that the stroke of the valve body 1 can be adjusted only up to an intermediate position between the closed valve seat position and the fully opened valve seat position.

By means of the piezo actuator 4, the valve body stroke can preferably be specifically driven to any desired value.

An adjustable stroke, in particular a reduced stroke to only an intermediate position, can be advantageous, e.g., at the start of the application and/or at the end of the application.

For example, the last x application agent droplets can be run with reduced stroke, e.g., to minimize a "thread pull".

For example, the first x application agent droplets (especially at the beginning of the seam) can be run with reduced stroke to prevent a "hammer head".

It should be mentioned that the piezo actuator 4 can also be configured to brake the valve body 1, preferably such that the valve body 1 encounters the valve seat 2 with reduced velocity.

As previously explained with reference to the adjustable stroke, the braking of the valve body 1 can also be effected, e.g., by a change of the excitation energy (in particular voltage, expediently voltage signals, by means of which the piezo actuator 4, in particular the at least one piezo active element 4.1 (e.g. piezo stack), is applied with.

In particular, braking of the valve body 1 can be realized by a suitable voltage profile at the piezo actuator 4.

Figure 20:
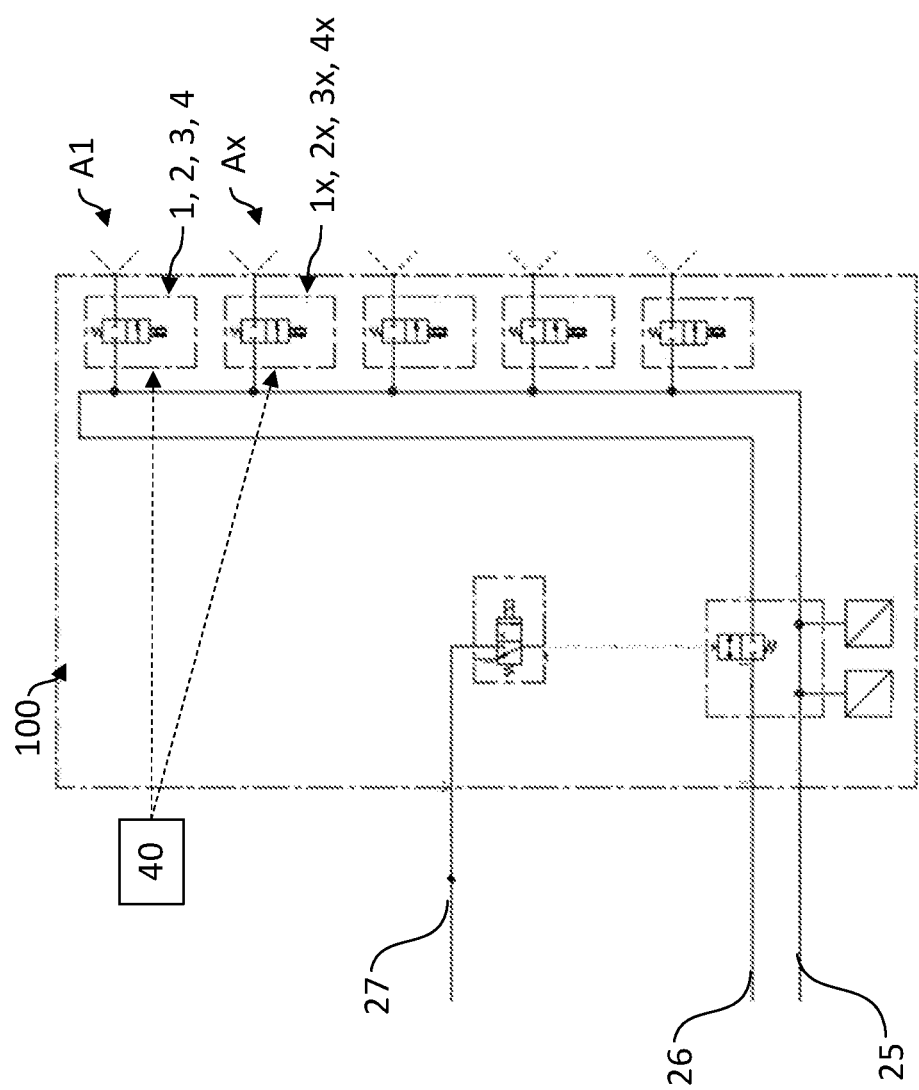
FIG. 20 shows a schematic view of a piezo actuator device according to an embodiment of the disclosure.
Figure 24:
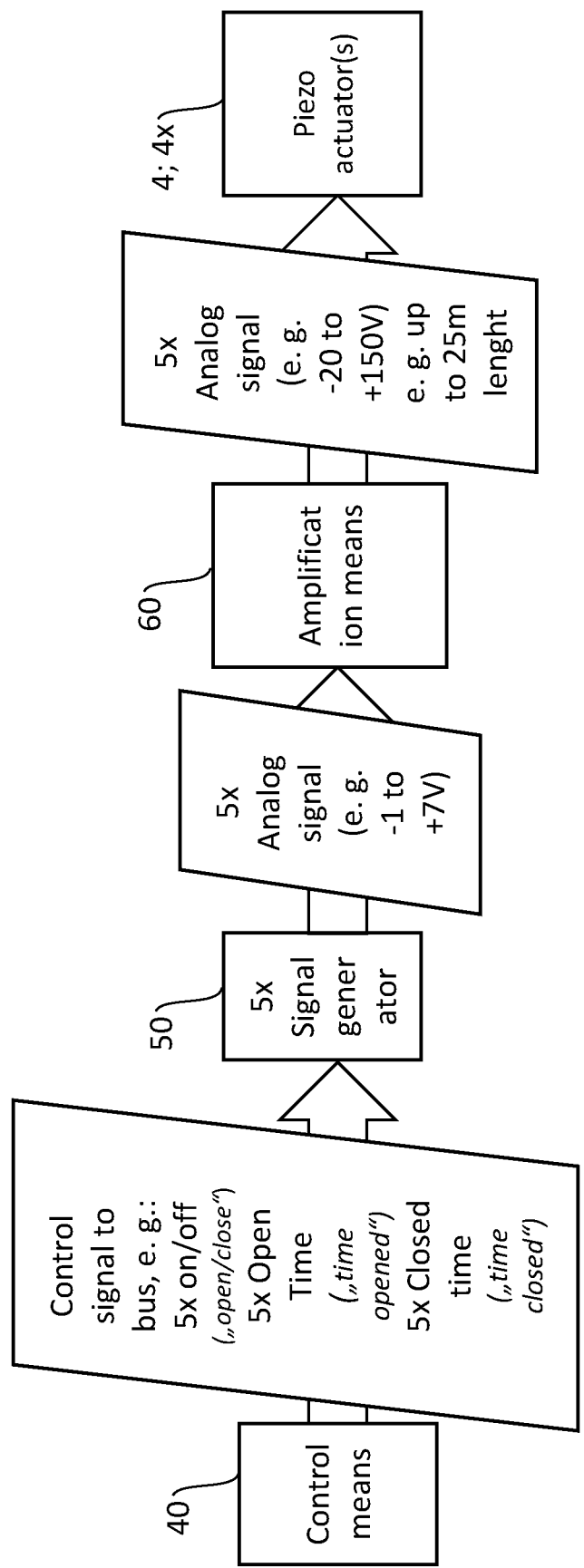
FIG. 24 shows a control scheme for a piezo actuator device according to an embodiment of the disclosure.

The piezo actuator device 100 can comprise a control means 40, in particular an electronic control means (e.g. a control unit, in particular with control software and/or control logic), shown e.g. in FIGS. 20 and 24, by means of which the electrical excitation energy for the piezo actuator 4 and thus the excitation energy supplied to the piezo actuator 4 can be controlled, in particular in order to be able to control and thus to advantageously adjust the stroke and/or the braking of the valve body 1.

Figure 12:
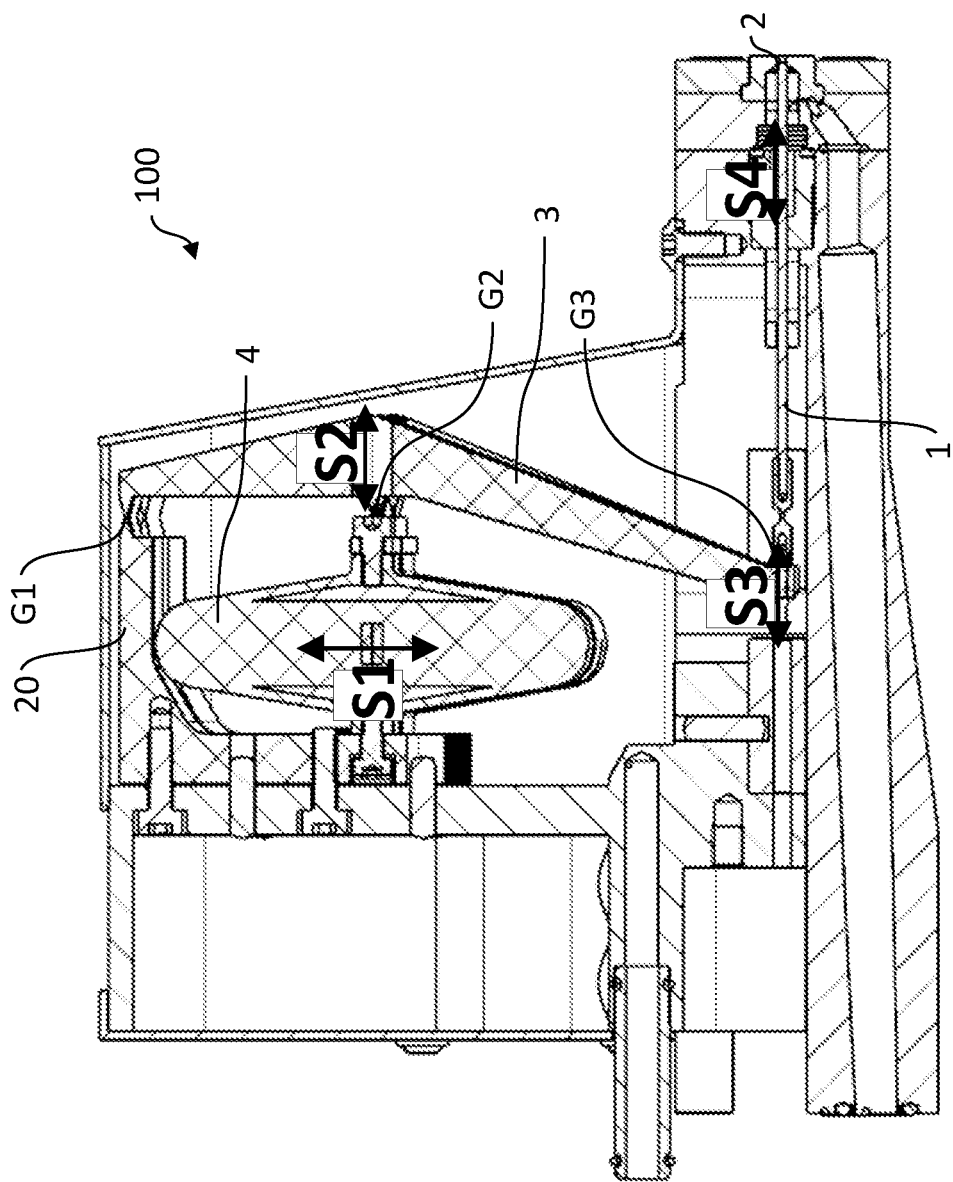

FIGS. 10 to 12 show, e.g., an embodiment in which the piezo actuator 4 actuates the actuating arm 3 in an actuating direction and the actuating direction is substantially parallel to the displacement direction of the valve body 1.

Figure 13:
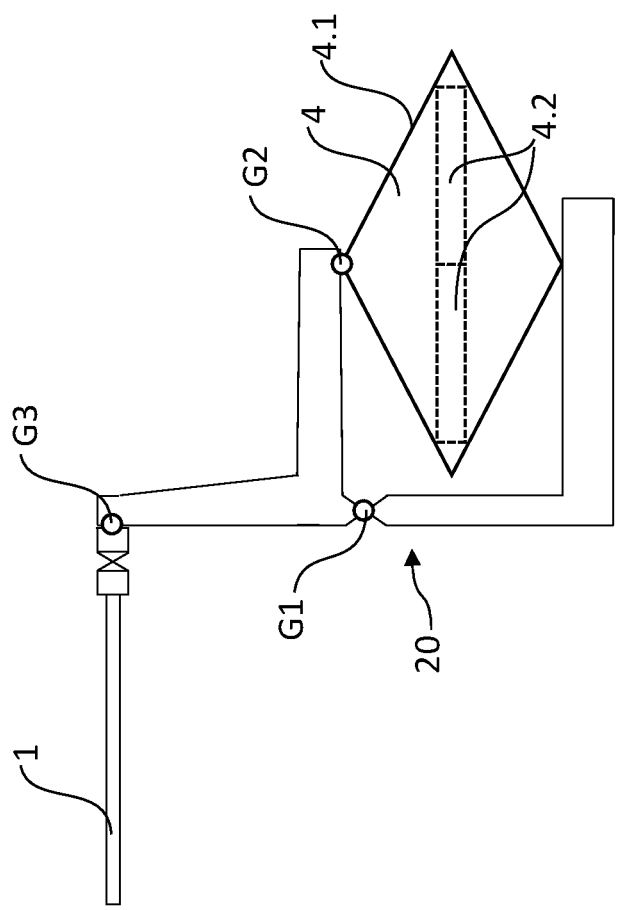
FIG. 13 illustrates in particular a functional/actuation principle according to another embodiment of the disclosure.

For example, FIG. 13 shows an embodiment in which the piezo actuator 4 actuates the actuating arm 3 in an actuating direction and the actuating direction is transverse (e.g., substantially perpendicular) to the displacement direction of the valve body 1.

A comparison of FIGS. 10 to 12 as well as FIG. 13 shows that therefor the installation situation of the piezo actuator 4 can in principle advantageously remain the same.

Figure 15:
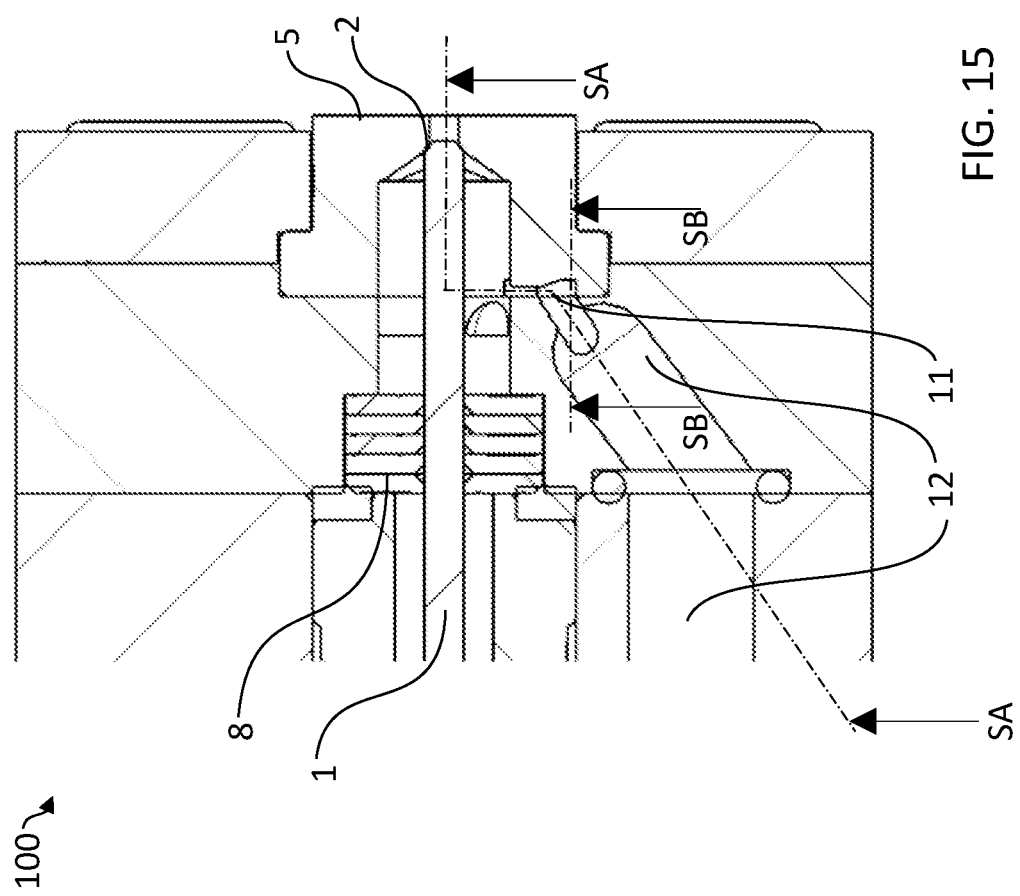
FIG. 15 shows a sectional view in particular of a valve seat and a sealing system of the piezo actuator device.

FIGS. 15 to 17 serve in particular to illustrate an application agent supply to multiple valve bodies 1; 1x, in particular an application agent supply to a chamber preferably directly upstream of the valve seats 2; 2x.

A slot-shaped connection 11 with different passage cross-sections is provided, via which the application agent can be supplied to at least two valve bodies 1; 1x. The different passage cross-sections are configured for substantially uniform distribution of the application agent to the at least two valve bodies 1; 1x.

The slot-shaped connection 11 can be configured, in particular, in the head piece 6 and/or in the nozzle plate 5 and can be fed by an application agent supply line 12 at or in the lance body 30.

Coming from the application agent supply line 12, the application agent can thus, via the slot-shaped connection 11, be distributed, preferably substantially uniformly, to the valve bodies 1; 1x.

Here, the slot-shaped connection 11 is configured in particular in such a way that it comprises a larger passage cross-section for outer valve bodies, up to which the application agent has to travel a relatively long distance, than, e.g., for one or more centrally arranged valve bodies, up to which the distance is comparatively short.

This can advantageously enable that the outer valve bodies are also supplied with application agent just as good as the inner valve bodies.

Pressure levels upstream of the valve seats are thus advantageously also substantially the same.

Figure 19:
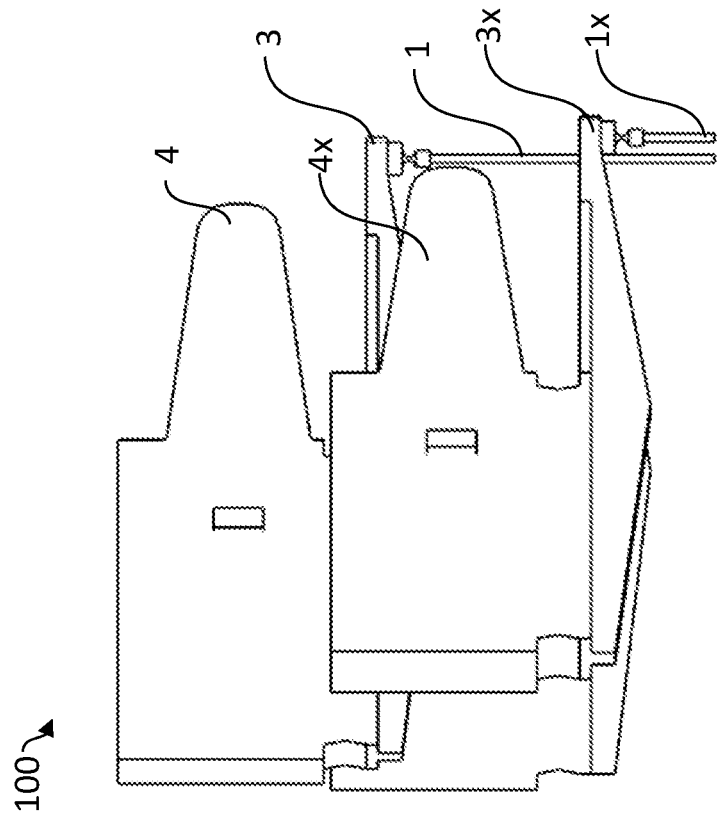
Figure 18:
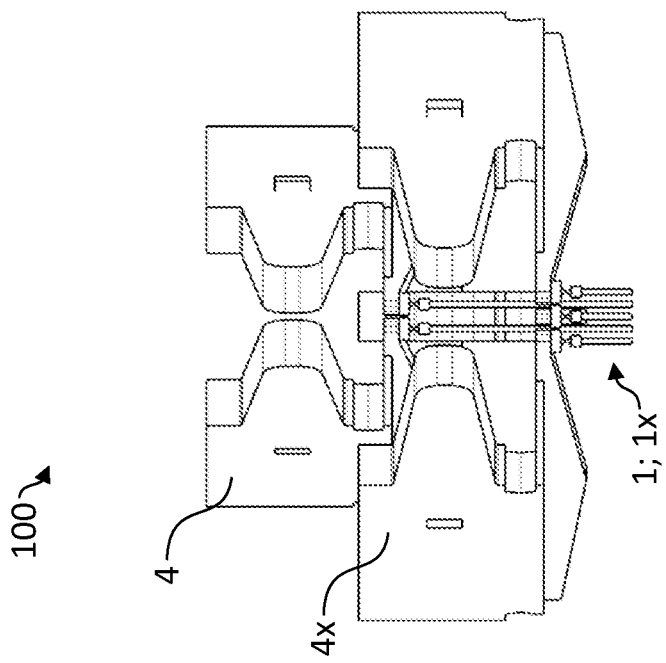

FIGS. 18 and 19 show different views of a part of a piezo actuator device 100 according to an embodiment of the disclosure.

At least two piezo actuators 4; 4x can be arranged offset from each other preferably relative to the longitudinal direction of at least two valve bodies 1; 1x and actuate at least two valve bodies 1; 1x of different lengths.

This advantageously allows a high packing density. The valve bodies 1; 1x can thus be arranged advantageously in a small grid dimension.

FIG. 20 shows a schematic view of a piezo actuator device 100.

The piezo actuator device 100 can, e.g., comprise an application agent supply 25 and an application agent return 26 in order to have the option of circulating the application agent. If this can be dispensed with, it is possible to also use the application agent return 26 as an application agent supply, so that the piezo actuator device 100 can selectively be operated with two different application agents. The piezo actuator device 100 can thus also comprise at least two application agent supplies, via which different application agents can be supplied for in particular selective application. Reference sign 27 indicates a pneumatic feed.

FIG. 20 also schematically shows a control means 40, which is configured in particular for controlling the piezo actuators 4, 4x, expediently for controlling the excitation energy for the piezo actuators 4, 4x.

Figure 21:
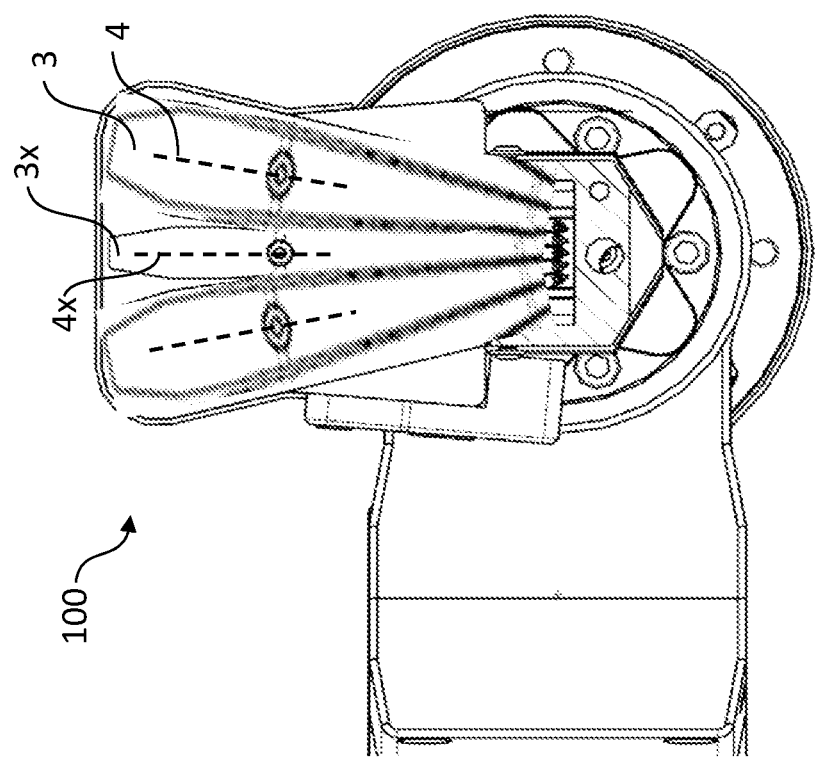
FIG. 21 shows a top view of a part of a piezo actuator device according to an embodiment of the disclosure.

FIG. 21 shows an embodiment with e.g. three schematically shown piezo actuators 4 and e.g. five valve bodies.

FIG. 21 serves in particular to illustrate an embodiment in which a piezo actuator 4, in particular a single piezo actuator 4, is used to actuate, preferably by means of at least one actuating arm 3, at least two valve bodies. Embodiments are also possible in which a single piezo actuator can be used to actuate, preferably by means of at least two actuating arms, at least two valve bodies.

In the context of the disclosure, in particular a summarization of at least two valve bodies that are actuatable via in particular a single piezo actuator 4 is possible.

In this way, the complexity and the costs can be advantageously reduced, wherein it is alternatively or additionally simpler to realize a piezo actuator device 100 with, e.g., at least five or even at least six valve bodies.

A summarization can also be considered, in particular, if no "high resolution" of the application agent result is required and/or not all valve bodies have to be controlled separately.

FIG. 21 shows in particular an embodiment with expediently five valve bodies 1; 1x and three piezo actuators 4; 4x, wherein also any other distributions are possible, e.g. six valve bodies and three piezo actuators or eight valve bodies and three or four piezo actuators, etc.

FIG. 9, e.g., shows for comparison an embodiment in which per valve body 1; 1x respectively a single piezo actuator 4 is preferably provided. Thus, FIG. 9 shows an embodiment with, in particular, five valve bodies 1; 1x and five piezo actuators 4; 4x.

Thus, the piezo actuator device 100 can comprise the same number of valve bodies as piezo actuators or can comprise more valve bodies than piezo actuators.

Figure 22:
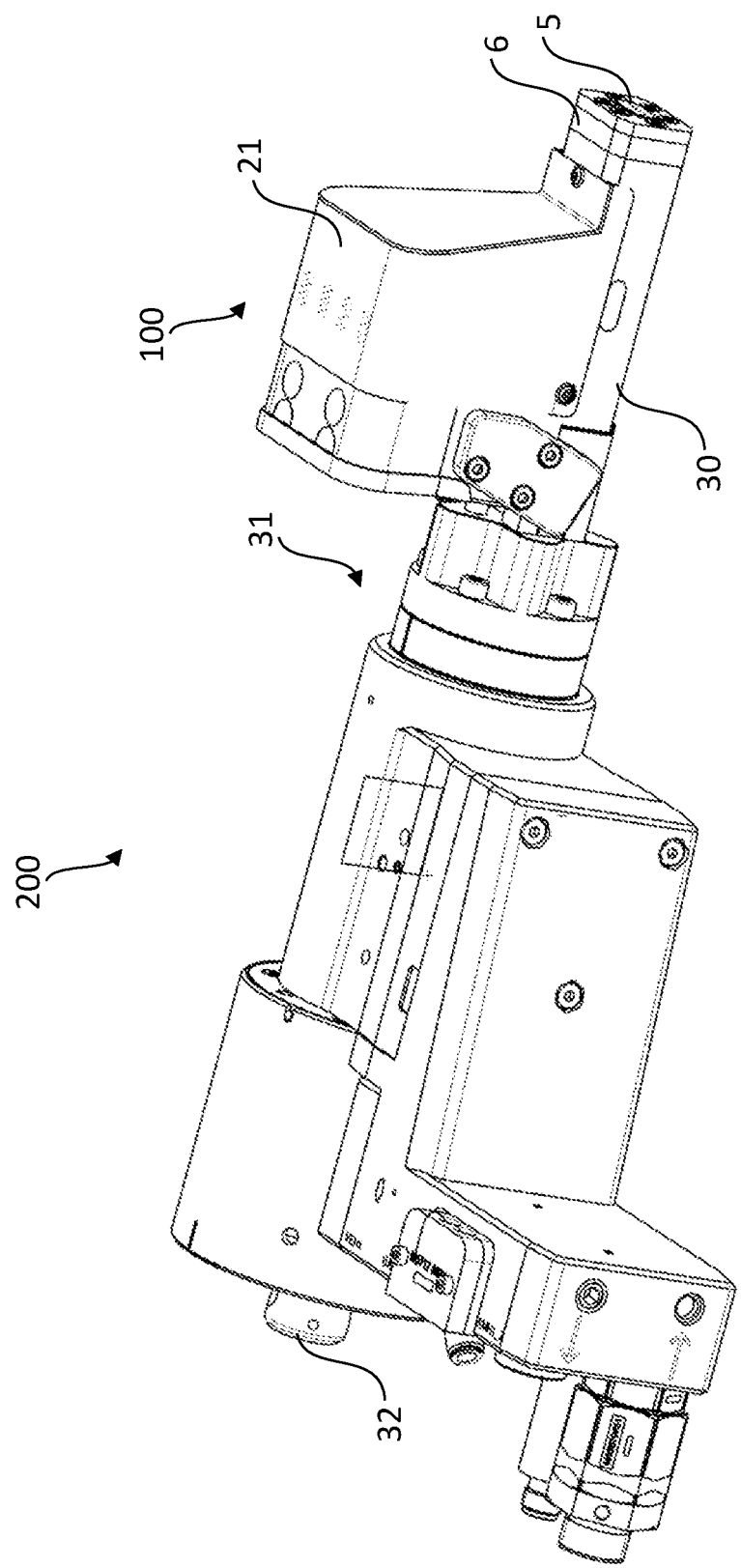
FIG. 22 shows a perspective view of an application device with a piezo actuator device according to an embodiment of the disclosure.
Figure 23:
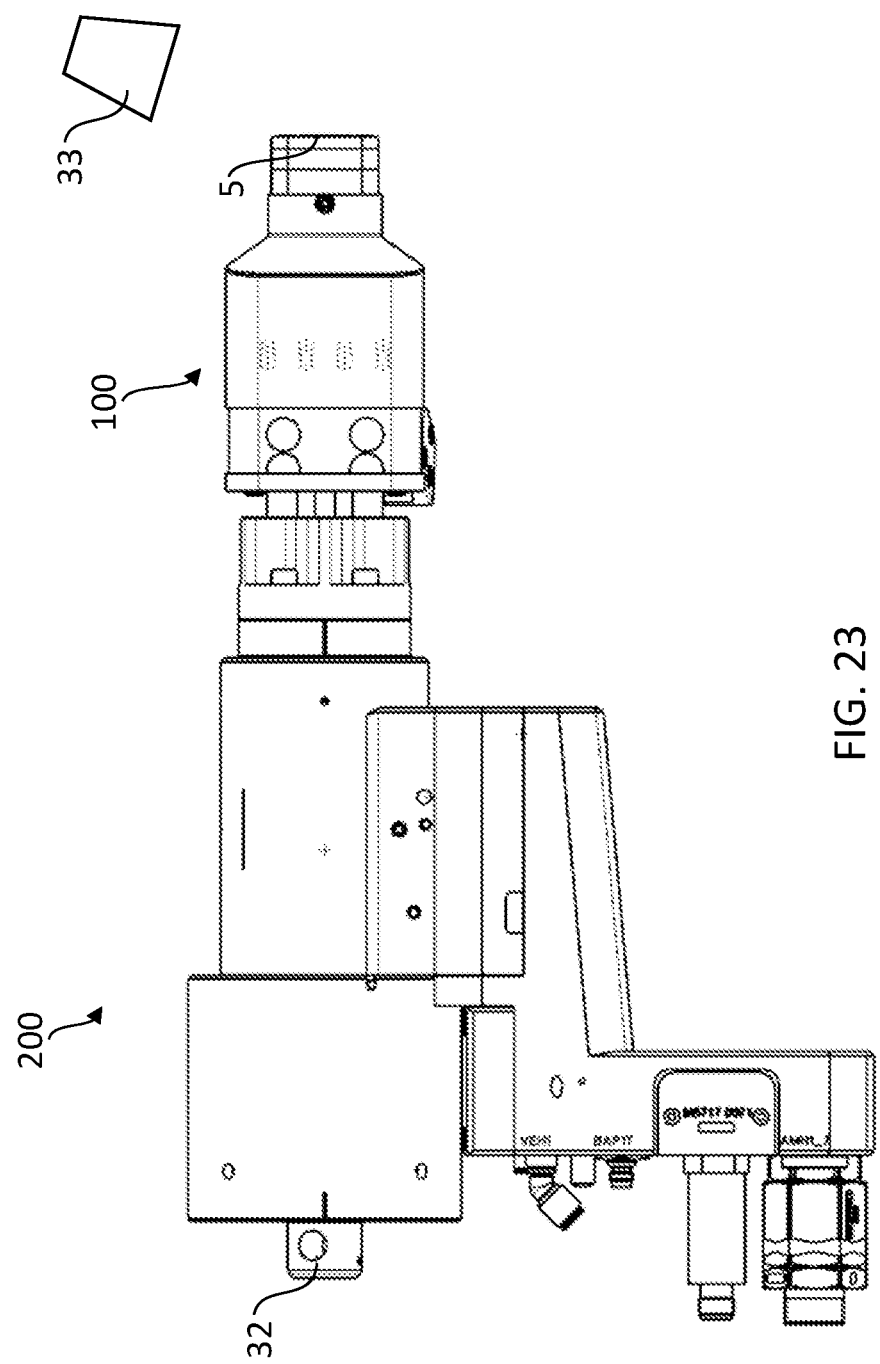
FIG. 23 shows a side view of the application device.

FIGS. 22 and 23 show different views of an application device 200 for producing a seam seal on a component, with a piezo actuator device 100 as disclosed herein.

In an embodiment, the lance body 30 can be rotatable about its longitudinal axis and can be connected to a rotary feedthrough 31, via which the application agent can be supplied and/or returned.

Reference sign 32 indicates an interface for mounting to a robot or manipulator, wherein embodiments in which the application device 200 is mounted stationary are also possible.

The application device 200 can comprise a camera or laser based detection system 33, shown only schematically, to perform a component measurement and/or to detect the application result for performing a preferably online quality check.

FIG. 24 shows a control scheme, in particular a signal processing scheme for a piezo actuator device 100 according to an embodiment of the disclosure.

A control means 40 is provided, by means of which the excitation energy for the piezo actuator 4 and thus the excitation energy supplied to the piezo actuator 4 can be controlled, in particular via a generator means 50 and an optional amplification means 60, preferably in order to control the stroke and/or the braking of the valve body 1.

The generator means 50 serves to generate the excitation energy for the piezo actuator 4, in particular to generate (e.g., substantially rectangular, pre-shaped and/or suitable for braking) voltage signals (e.g., −1V to +7V) for the piezo actuator 4. For example, own voltage signals can advantageously be generated per piezo.

The control means 40 is used in particular to control the generator means 50 and/or the amplification means 60.

The optional amplification means 60 serves to amplify the excitation energy generated by the generator means 50. For example, the voltage signals (e.g., −1V to +7V) can be amplified by a factor of, e. g., 20+/−5 (e.g., −20V to +140V) by the amplification means 60. Amplification can be omitted, amplification can be reduced, or amplification can be increased, e.g., for braking and/or for realization of the stroke intermediate position. The amplification means 60 can be arranged, e.g., in a control cabinet.

The optionally amplified excitation energy and thus the voltage signals can be supplied to the piezo actuator 4. Preferably, the voltage signals are substantially rectangle voltage signals.

The piezo actuator 4 can accordingly (preferably via the lever transmission) actuate the valve body 1, in particular accordingly cause a stroke and/or a braking of the valve body 1.

Thus, the shape of the stroke curve and/or braking curve can, in principle, substantially correspond to the curve of the voltage signals generated by the generator means 50.

However, it is possible, e.g., that the excitation energy and thus the voltage signals are pre-shaped (expediently "pre-shaping" of the voltage signals), e.g. in order to prevent the stroke of the valve body 1 from overswinging (e.g. in the case of fast control).

The control scheme can be used for one piezo actuator 4 or multiple piezo actuators 4; 4x.

Advantages of the adjustable stroke and the braking are, e.g.: Less wear on the valve body 1 and/or in the valve seat 2 due to fewer strokes and/or reduced force when the valve seat 2 is closed by the valve body 1 and alternatively or additionally less noisiness generation, in particular in the high frequency region.

Another possibility for noise reduction is the use of counter noise generation and/or active noise reduction (expediently "anti-noise"-"Active Noise Reduction" ("ANR")).

For example, the control means 40 can be configured to control at least two piezo actuators 4, 4x with excitation energy expediently in a phase-shifted manner, preferably in such a way that at least two valve bodies 1, 1x encounter their valve seat 2, 2x in a phase-shifted and/or time-shifted manner. This can advantageously enable counter noise generation and/or active noise reduction.

Thus, noisiness of the at least one valve body 1 can be reduced or even substantially eliminated, preferably by phase-shifted control of the at least one piezo actuator 4x of the at least one other valve body 1x.

The basic idea is thus to reduce or substantially cancel arising noisiness of at least one valve body 1, expediently by phase-shifted control of at least one piezo actuator 4x of at least one other valve body 1x.

The control means 40 can control at least two piezo actuators 4, 4x, e.g., phase-shifted by substantially 180° and/or by means of at least approximately destructive interference.

The disclosure includes a piezo actuator device, in particular for controlling a dispensing of an application agent onto a component, wherein the piezo actuator device can comprise, e.g., the following or, in particular, a functional unit of the piezo actuator device can comprise the following and/or, in particular, at least two functional units of the piezo actuator device can respectively comprise the following:

at least one (preferably axially back and forth) movable valve body (e.g., a valve needle) for opening and closing at least one valve seat, at least one actuating arm (preferably pivotable, in particular configured as an actuating lever) for actuating the at least one valve body, and a piezo actuator, e.g. a single piezo actuator, which is preferably configured to move the at least one valve body to close and/or to open the at least one valve seat.

The disclosure is not limited to the preferred embodiments described above. Rather, a large number of variants and modifications are possible which also make use of the inventive concept and therefore fall within the scope of protection.

The invention claimed is:

1. A piezo actuator device, that controls dispensing of an application agent onto a component, comprising:
    at least one movable valve body for opening and closing at least one valve seat,
    at least one pivotable actuating arm for actuating the at least one movable valve body, and
    a piezo actuator configured to move the at least one movable valve body to close and/or open the at least one valve seat, wherein the piezo actuator device is connected to an application agent supply and an application agent return for application agent circulation or is connected to at least two application agent supplies, via which different application agents can be supplied.

2. The piezo actuator device according to claim 1, further comprising a functional unit comprising:
    the at least one movable valve body for opening and closing the at least one valve seat,
    the at least one actuating arm for actuating the at least one movable valve body, and
    the piezo actuator configured to move the at least one movable valve body to close and/or open the at least one valve seat.

3. The piezo actuator device according to claim 1, wherein the piezo actuator is configured to move the at least one movable valve body to a fully closed valve seat position, and/or to move the at least one movable valve body to a fully opened valve seat position.

4. The piezo actuator device according to claim 3, wherein a single piezo actuator is provided for moving the at least one movable valve body.

5. The piezo actuator device according to claim 4, wherein the piezo actuator serves for actuating the at least one actuating arm and/or the piezo actuator is configured to move, by means of the at least one actuating arm, the at least one movable valve body to close and/or open the at least one valve seat.

6. The piezo actuator device according to claim 5, wherein the at least one actuating arm is part of a three-joint lever mechanism.

7. The piezo actuator device according to claim 5, wherein
    the at least one actuating arm is pivotable about a first joint, and/or
    the piezo actuator is coupled to the at least one actuating arm via a second joint, and/or
    the at least one actuating arm is coupled to the at least one movable valve body via a third joint.

8. The piezo actuator device according to claim 7, wherein at least one of the joints
    is configured by a material weakening,
    is one-piece integrally connected to the at least one actuating arm, and/or
    is configured as a solid body joint.

9. The piezo actuator device according to claim 2, wherein the at least one actuating arm is part of a frame and the piezo actuator is arranged within the frame.

10. The piezo actuator device according to claim 2, wherein the piezo actuator is fixedly mounted on the frame in its transverse direction on one side and is coupled to the at least one actuating arm on the other side and/or the piezo actuator is deformable in its longitudinal direction.

11. The piezo actuator device according to claim 2, wherein the piezo actuator comprises an elastically deformable frame structure, wherein the frame structure is configured as a bending stress frame and/or for amplification of an actuating force on the at least one actuating arm.

12. The piezo actuator device according to claim 11, wherein at least one piezo active element is accommodated in the frame structure for longitudinally oriented deformation of the frame structure, to effect a transversely oriented deformation of the frame structure for generating an actuating force on the at least one actuating arm.

13. The piezo actuator device according to claim 11, wherein the frame structure
    is circumferential in its circumferential direction and/or
    is configured elongated and actuates the at least one actuating arm transversely to its longitudinal direction.

14. The piezo actuator device according to claim 11, wherein in the frame structure multiple piezo active elements are, in the longitudinal direction of the frame structure, coupled to each other and to the frame structure.

15. The piezo actuator device according to claim 2, wherein the piezo actuator actuates the at least one actuating arm in an actuating direction and the actuating direction is substantially parallel or transverse to the displacement direction of the at least one movable valve body.

16. The piezo actuator device according to claim 2, wherein the piezo actuator is configured to adjust a stroke of the at least one movable valve body, to at least one intermediate position, one or more arbitrary intermediate positions, between a closed valve seat position and a fully opened valve seat position, whereby a throttling function is enabled, a generation of droplet jets or application agent jets is enabled, and/or an application agent droplet size is changeable.

17. The piezo actuator device according to claim 16, wherein the stroke is adjustable in dependence of an excitation energy for the piezo actuator and/or the stroke extends only to the at least one intermediate position.

18. The piezo actuator device according to claim 2, wherein the piezo actuator is configured to brake the at least one movable valve body, such that the at least one movable valve body encounters the at least one valve seat with reduced velocity.

19. The piezo actuator device according to claim 18, wherein the braking of the at least one valve body is adjustable in dependence of an excitation energy for the piezo actuator.

20. The piezo actuator device according to claim 2, wherein the at least one movable valve body is operatively connected to a preloading element for generating a preload in order to actuate, by means of the preload, the at least one movable valve body to close the at least one valve seat.

21. The piezo actuator device according to claim 20, wherein the at least one movable valve body is fastened to the at least one actuating arm by means of a fastening element and the fastening element serves to receive and/or guide the preloading element.

22. The piezo actuator device according to claim 20, wherein the at least one movable valve body, the preloading element and/or the fastening element are arranged substantially coaxially.

23. The piezo actuator device according to claim 2, wherein the piezo actuator device comprises at least one compensation underlay for position and/or preload adjustment of the at least one movable valve body, or comprises at least one compensation underlay for common position and/or preload adjustment of at least two movable valve bodies.

24. The piezo actuator device according to claim 23, wherein a frame or at least two frames are mounted on at least one compensation underlay.

25. The piezo actuator device according to claim 2, wherein the piezo actuator device comprises an external nozzle plate in which at least two valve seats and at least two dispensing openings for dispensing of application agent are configured.

26. The piezo actuator device according to claim 25, wherein the piezo actuator device comprises a head piece, at an outlet side of which the nozzle plate is arranged and through which at least two movable valve bodies are passed.

27. The piezo actuator device according to claim 26, wherein the head piece and/or the nozzle plate is demountable, for movable valve body removal from the piezo actuator device.

28. The piezo actuator device according to claim 2, wherein the piezo actuator device comprises a sealing system for sealing at least two movable valve bodies and the sealing system is configured from multiple metal plates and/or forms a labyrinth seal.

29. The piezo actuator device according to claim 28, wherein the sealing system is arranged at or in the head piece.

30. The piezo actuator device according to claim 2, wherein at least two valve seats and at least two dispensing openings for dispensing application agent are configured in one and the same nozzle plate.

31. The piezo actuator device according to claim 2, wherein the piezo actuator device comprises at least two actuating arms arranged angularly to each other and/or at least two piezo actuators arranged angularly to each other and/or at least two frames arranged angularly to each other.

32. The piezo actuator device according to claim 31, wherein the at least two piezo actuators are controllable independently of one another and/or are actuatable independently of one another with different actuation frequencies.

33. The piezo actuator device according to claim 2, wherein the piezo actuator device comprises at least two actuating arms whose longitudinal axes approach each other in a direction of the at least one movable valve body.

34. The piezo actuator device according to claim 2, wherein the piezo actuator device comprises at least two actuating arms whose cross sections taper in a direction of the at least one movable valve body.

35. The piezo actuator device according to claim 2, wherein the piezo actuator device comprises at least two piezo actuators, which are, relative to a longitudinal direction of at least two movable valve bodies, arranged offset to each other and actuate at least two movable valve bodies of different lengths.

36. The piezo actuator device according to claim 2, wherein the piezo actuator device comprises a slot-shaped connection to supply application agent to at least two movable valve bodies, wherein the slot-shaped connection comprises different passage cross-sections for substantially uniform distribution of the application agent to the at least two movable valve bodies.

37. The piezo actuator device according to claim 36, wherein the slot-shaped connection is configured in the nozzle plate and/or in the head piece.

38. The piezo actuator device according to claim 2, wherein the piezo actuator device comprises an individual guide component, by means of which at least two movable valve bodies are axially guided at at least two guide positions spaced apart from one another, and the at least two movable valve bodies run bearing-free between the at least two guide positions.

39. The piezo actuator device according to claim 26, wherein the piezo actuator device comprises a lance body, on a front side of which the head piece and/or the nozzle plate is arranged and in which the at least two movable valve bodies extend.

40. The piezo actuator device according to claim 39, wherein the piezo actuator device comprises a housing, which is arranged laterally outside at the lance body and in which at least two piezo actuators, at least two actuating arms and at least two frames are arranged.

41. The piezo actuator device according to claim 39, wherein the lance body is rotatable about its longitudinal axis and is connected to a rotary feedthrough via which the application agent can be supplied and/or returned.

42. The piezo actuator device according to claim 2, wherein the piezo actuator device is connected to a heating means by means of which the application agent can be heated.

43. The piezo actuator device according to claim 2, wherein the piezo actuator device comprises at least two movable valve bodies which are commonly moved by a piezo actuator, a single piezo actuator.

44. The piezo actuator device according to claim 2, wherein the piezo actuator device comprises the same number of movable valve bodies as piezo actuators or comprises more movable valve bodies than piezo actuators and/or comprises more dispensing openings than movable valve bodies.

45. The piezo actuator device according to claim 2, wherein the piezo actuator device
is configured for generating application agent droplets,
is configured for generating application agent jets,
is configured for selectively generating application agent droplets and application agent jets, and/or
is configured to apply to the at least one movable valve body an in particular variable actuating frequency which is variable between 0 Hz to at least 400 Hz, to at least 450 Hz, to at least 550 Hz, to at least 650 Hz or to at least 700 Hz.

46. The piezo actuator device according to claim 2, wherein a control means is provided.

47. The piezo actuator device according to claim 46, wherein by means of the control means an excitation energy for the piezo actuator and/or multiple piezo actuators is controllable.

48. The piezo actuator device according to claim 2, wherein a generator means is provided for generating an excitation energy for the piezo actuator and/or multiple piezo actuators.

49. The piezo actuator device according to claim 48, wherein an amplification means is provided for amplification of the excitation energy generated by the generator means.

50. The piezo actuator device according to claim 46, wherein the control means is configured to control the generator means and/or the amplification means.

51. The piezo actuator device according to claim 46, wherein the control means is configured to control an excitation energy for the piezo actuator and/or multiple piezo actuators in order to control a stroke and/or a braking of the at least one movable valve body.

52. The piezo actuator device according to claim 2, wherein the piezo actuator
comprises a preload to actuate, by means of the preload, the at least one actuating arm to close the at least one valve seat, and/or
is supplied with excitation energy to open the at least one valve seat.

53. A piezo actuator device, that controls dispensing of an application agent onto a component, comprising:
at least one valve body for opening and closing at least one valve seat,
at least one pivotable actuating arm for actuating the at least one valve body, and
a piezo actuator configured to move the at least one valve body to close and/or open the at least one valve seat, wherein the piezo actuator device comprises at least two piezo actuators, which are, relative to the longitudinal direction of at least two valve bodies, arranged offset to each other and actuate at least two valve bodies of different lengths.

54. A piezo actuator device, that controls dispensing of an application agent onto a component, comprising:
at least one valve body for opening and closing at least one valve seat,
at least one pivotable actuating arm for actuating the at least one valve body,
a piezo actuator configured to move the at least one valve body to close and/or open the at least one valve seat, and
a computing unit configured to control at least two piezo actuators in a phase-shifted manner, for active noise reduction and/or counter noise generation, in particular in such a way that at least two valve bodies encounter their valve seat in a phase-shifted and/or time-shifted manner.

55. The piezo actuator device according to claim 54, wherein the control means is configured to control the at least two piezo actuators phase-shifted by substantially 180° and/or by means of substantially destructive interference.

* * * * *